US010510137B1

(12) United States Patent
Kitain et al.

(10) Patent No.: US 10,510,137 B1
(45) Date of Patent: Dec. 17, 2019

(54) HEAD MOUNTED DISPLAY (HMD) APPARATUS WITH A SYNTHETIC TARGETING SYSTEM AND METHOD OF USE

(71) Applicant: LOCKHEED MARTIN CORPORATION, Bethesda, MD (US)

(72) Inventors: Joshua D. Kitain, Orlando, FL (US); Spencer J. Frazier, Somerville, MA (US); Gregory A. Harrison, Oviedo, FL (US); David J. Macannuco, Winchester, MA (US); Atul Patel, Longwood, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 3 days.

(21) Appl. No.: 15/848,620

(22) Filed: Dec. 20, 2017

(51) Int. Cl.
*G06T 3/40* (2006.01)
*G06T 19/00* (2011.01)
*G02B 27/01* (2006.01)
*F41G 3/16* (2006.01)
*F41G 3/26* (2006.01)

(52) U.S. Cl.
CPC .............. *G06T 3/40* (2013.01); *F41G 3/165* (2013.01); *F41G 3/2611* (2013.01); *G02B 27/0172* (2013.01); *G02B 27/0179* (2013.01); *G02B 27/0189* (2013.01); *G06T 19/006* (2013.01); *G02B 2027/014* (2013.01); *G02B 2027/0123* (2013.01); *G02B 2027/0138* (2013.01);
(Continued)

(58) Field of Classification Search
CPC ......... G06T 3/40; G06T 19/006; F41G 3/165; F41G 3/2611; G02B 27/0172; G02B 27/0179; G02B 27/0189; G02B 2027/0123; G02B 2027/0138; G02B 2027/014; G02B 2027/0141; G02B 2027/0187; G02B 27/017; G02B 2027/0178; G06F 3/013; G06F 3/04815; G06F 3/012; G06F 3/0346; G06F 3/014; G06F 3/0484; G06F 1/163
See application file for complete search history.

(56) References Cited

U.S. PATENT DOCUMENTS 5,583,795 A  12/1996 Smyth
6,433,760 B1  8/2002 Vaissie
(Continued)

OTHER PUBLICATIONS

Q-WARRIOR: <https://en.wikipedia.org/wiki/Q-Warrior>; <https://en.wikipedia.org/w/index.php?title=Q-Warrior&oldid=601818799>. First entry created Mar. 16, 2014.
(Continued)

*Primary Examiner* — Xilin Guo
(74) *Attorney, Agent, or Firm* — Terry M. Sanks, Esq.; Beusse Wolter Sanks & Maire, PLLC

(57) ABSTRACT

A method comprising detecting, by a processor, an optical sight of a device in range of a lens of a head mounted display (HMD) apparatus. The lens has an HMD field of view (H-FOV) of a real-world view. The method comprises determining, by the processor, a magnification factor of a sight field of view (S-FOV) for the detected sight. The method includes displaying, by a display device of the HMD apparatus, computer generated data (CGD) in the S-FOV relative to a magnification level according to the magnification factor of the S-FOV of the real-world view while looking through the sight. A system and computer readable medium are also provided.

20 Claims, 17 Drawing Sheets

(52) U.S. Cl.
CPC ............... *G02B 2027/0141* (2013.01); *G02B 2027/0187* (2013.01)

(56) References Cited

U.S. PATENT DOCUMENTS

| | | | |
|---|---|---|---|
| 7,401,920 B1 | 7/2008 | Kranz | |
| 8,678,282 B1 | 3/2014 | Black | |
| 8,928,558 B2 | 1/2015 | Lewis | |
| 9,606,622 B1 | 3/2017 | Brothers | |
| 2009/0040308 A1* | 2/2009 | Temovskiy | G02B 27/0068 348/158 |
| 2013/0050432 A1* | 2/2013 | Perez | G02B 27/017 348/47 |
| 2014/0375790 A1 | 12/2014 | Robbins | |
| 2015/0213634 A1 | 7/2015 | Karmarkar | |
| 2016/0259977 A1 | 9/2016 | Asbun | |

OTHER PUBLICATIONS

O'Connell, Stephen D., et al. "Eye Tracking-Based Target Designation in Simulated Close Range Air Combat". Proceedings of the Human Factors and Ergonomics Society 56th Annual Meeting 2012, 56:46, pp. 45-50. Oct. 26, 2012.

Ferrari, Gina A.R., et al. "Can't Look Away: An Eye-Tracking Based Attentional Disengagement Training for Depression". Cognitive Therapy and Research, vol. 40, Issue 5, pp. 672-686. Oct. 2016. (Published Online Mar. 16, 2016).

Tracking Point. "How It Works". <http://www.tracking-point.com/weapons/mi6/#how-it-works>.

Holographic Optical Elements: <http://www.luminitrd.com/HOE.html>. Copyright 2015, Luminit, LLC.

Topowl. "Helmet Mounted Sight & Display". Jan. 2014. Copyright 2014, Thales Avionics S.A.S.

Red Dot Sight: <https://en.wikipedia.org/wiki/Red_dot_sight>; <https://en.wikipedia.org/w/index.php?title=Red_dot_sight&oldid=822611522>. First entry created Oct. 26, 2014.

Tobii IS4 Platform: <https://www.tobii.com/tech/products/plafforms/>. Copyright 2018, Tobii AB.

Topowl. "Helmet Mounted Sight & Display". Copyright 2010, Thales Avionics S.A.S.

* cited by examiner

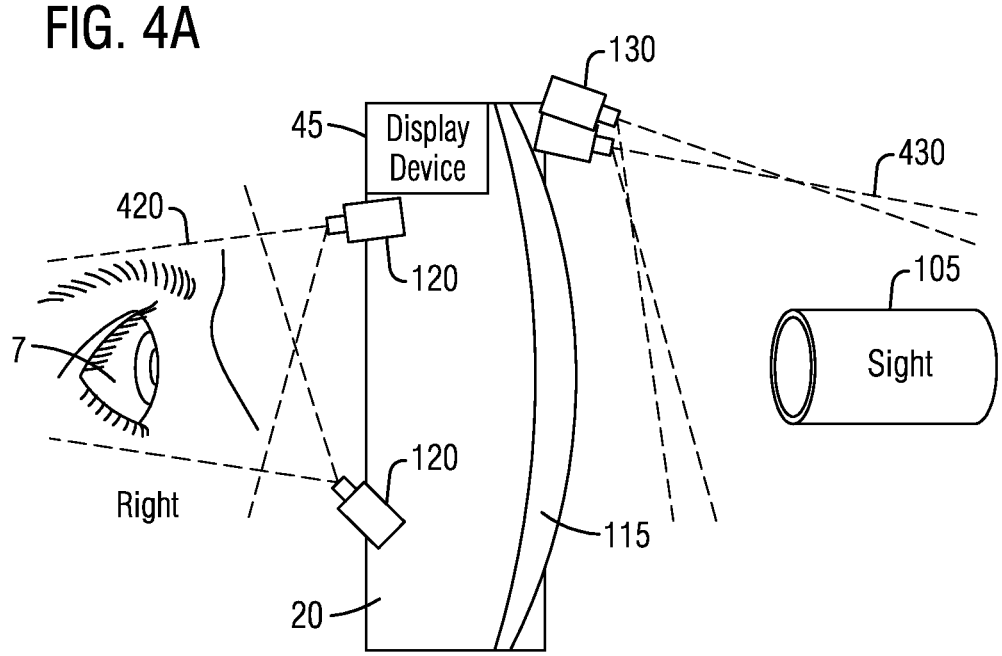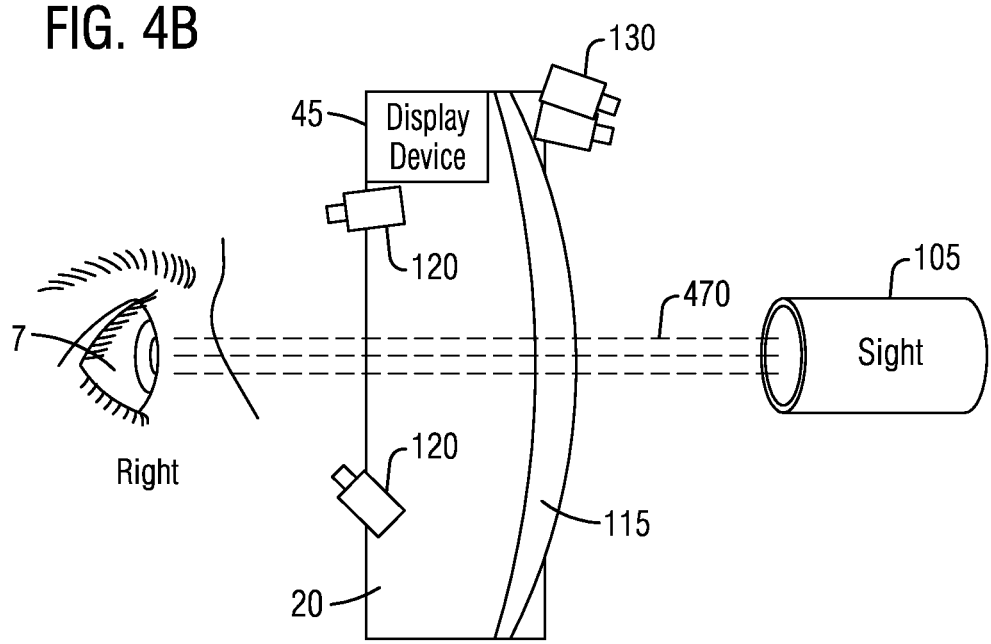

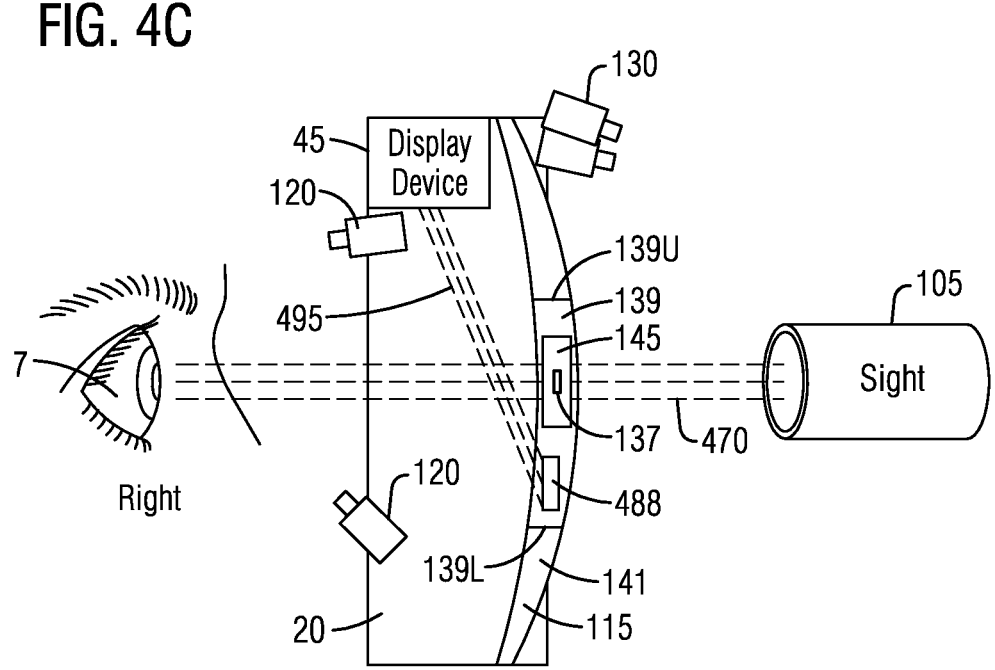
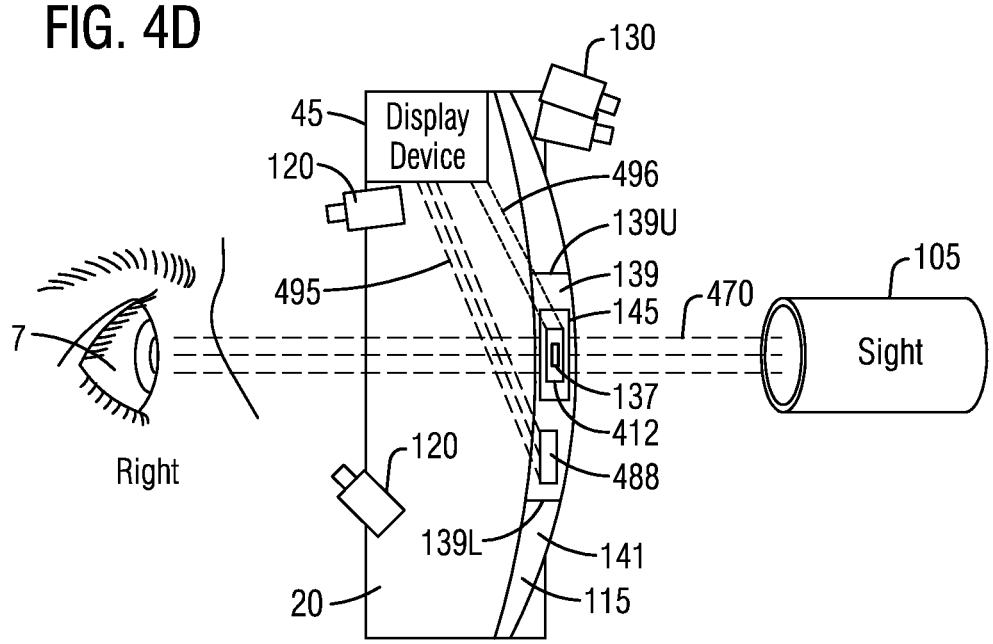

HEAD MOUNTED DISPLAY (HMD) APPARATUS WITH A SYNTHETIC TARGETING SYSTEM AND METHOD OF USE

BACKGROUND

Embodiments relate to a head mounted display (HMD) apparatus with a synthetic targeting system and method of use.

Head mounted display (HMD) technology aids a user with situational awareness and frees the hands of the wearer for other activities. Currently, a pilot helmet detects a pilot's gaze to control an aim direction of computer-controlled weapon mounted on a vehicle. The pilot's helmet causes a computer to control the position of the weapon based on movement of the head and gaze direction leaving the pilot's hands free to navigate the vehicle.

A Tactical Augmented Reality (TAR) HMD worn about the head of a soldier is generally underutilized because the TAR HMD has to be in a "stowed" position (flipped out of the user's field of view) while aiming a hand-held weapon. The sight, used to aim a hand-held weapon, provides a reticle or a colored dot marker to denote the target relative to the reticle and/or dot marker to mark the aiming spot of the weapon within the field of view (FOV) of the sight.

Many soldiers wear helmets with HMDs or wear other head-worn devices to mount the HMD to the wearer's head. Aiming through a sight while looking through a see-through lens of the HMD may also be a challenge and distort the sight's field of view.

SUMMARY

Embodiments relate to a synthetic targeting system, method and computer readable medium which aligns a sight field of view (S-FOV) with at least one of a synthetic targeting (ST) field of view (ST-FOV) and a see-through HMD field of view (H-FOV) of a head mounted display apparatus.

An aspect of the embodiments includes a method comprising: detecting, by a processor, an optical sight of a device in range of a lens of a head mounted display (HMD) apparatus, the lens having an HMD field of view (H-FOV) of a real-world view; determining, by the processor, a magnification factor of a sight field of view (S-FOV) for the detected sight; and displaying, by a display device of the HMD apparatus, computer generated data (CGD) in the S-FOV relative to a magnification level according to the magnification factor of the S-FOV of the real-world view while looking through the sight.

Another aspect of the embodiments includes a tangible, non-transitory computer readable medium having stored thereon program code configured to, when executed by a processor, to cause the processor to: detect an optical sight of a device in range of a lens of a head mounted display (HMD) apparatus, the lens having an HMD field of view (H-FOV) of a real-world view; determine a magnification factor of a sight field of view (S-FOV) for the detected sight; and cause a display device of the HMD apparatus to display computer generated data (CGD) in the S-FOV relative to a magnification level according to the magnification factor of the S-FOV of the real-world view while through the sight.

A still further aspect of the embodiments includes a system comprising a head mounted display (HMD) apparatus having HMD lenses with an HMD field of view (H-FOV) and at least one display device. The system comprises eye-tracking sensors to track eye movements coupled to the HMD apparatus, forward-facing sensors coupled to the HMD apparatus, and a processor coupled to the HMD apparatus. The processor is configured to detect an optical sight of a device in range of a respective one lens of the HMD lenses. The respective one lens has an HMD field of view (H-FOV) of a real-world view. The processor is configured to determine a magnification factor of a sight field of view (S-FOV) for the detected sight; and causes a respective one display device associated with the respective one lens to display computer generated data (CGD) in the S-FOV relative to a magnification level according to the magnification factor of the S-FOV of the real-world view while looking through the sight.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4A illustrates a side view of an arrangement of the plurality of eye tracking sensors and the plurality of sight detector sensors relative to the head mounted display (HMD) and sight;

FIG. 4B illustrates the side view of the arrangement of FIG. 4A with collimated light from the sight relative to the arrangement;

FIG. 4C illustrates the side view of the arrangement of FIG. 4B with information being displayed in the synthetic training field of view (ST-FOV) by an HMD apparatus;

FIG. 4D illustrates the side view of the arrangement of FIG. 4C with information being displayed in the synthetic training field of view (ST-FOV) and an eye gaze region of interest (EG-ROI) frame by an HMD apparatus;

DETAILED DESCRIPTION

Embodiments are described herein with reference to the attached figures. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
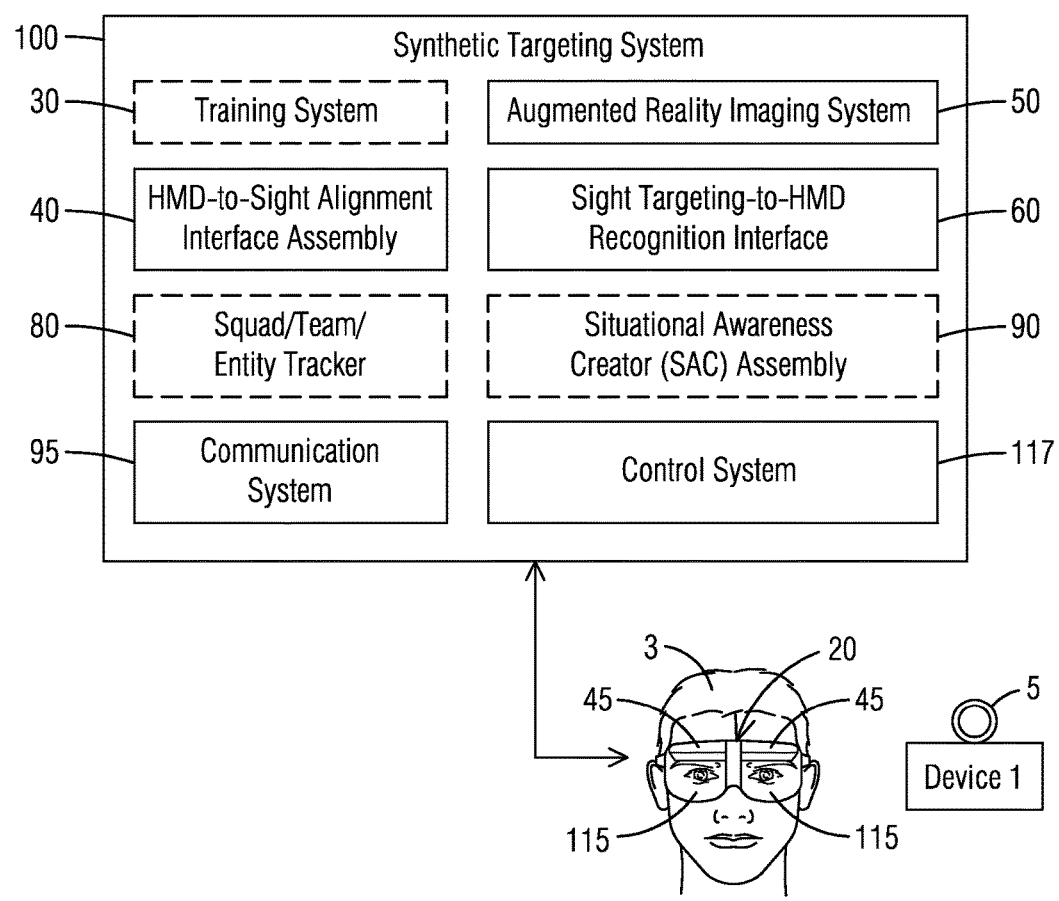
FIG. 1 illustrates a block diagram of a synthetic targeting (ST) system being used by a user with a device.

FIG. 1 illustrates a block diagram of a synthetic targeting (ST) system 100 being used by a user 3 holding a device 1 with a sight 5. By way of non-limiting example, the device 1 may be a weapon or firearm. The device 1 may be a separate camera device, machine, periscope or a telescope. By way of non-limiting example, the sight 5 may be a colored dot sight such as, without limitations, a red dot sight, green dot sight or blue dot sight. The sight may have a sight magnification factor or value such as, without limitation, in the range of IX to 10X. In the embodiments described herein, neither the device nor the sight requires any modifications for system 100 to perform the operations described herein and are not part of the embodiments.

As defined herein, the device 1 may be a hand-held, manually-operated and/or manually-pointed device. Other devices 1 are also contemplated wherein a sight can be looked through or down by a user 3. The sight may be integrated with the body or operation of the device 1. The device 1 may be mounted to a tripod or other stand which supports the device at a location, but allows the device 1 to be pivoted, rotated or articulated about the stand by the hands of the users. The device 1, when manually operated, requires pointing or aiming, such as a weapon, camera, periscope or telescope using a sight through which a user views a target or object of interest.

The term "sight" as used herein is interchangeable with the term "scope." The sight may be a colored dot sight which may be a non-magnifying or magnifying (optical) reflector sight that when aimed provides an aim point by displaying an illuminated colored dot in a real-world view through the lens of the sight. The sight lens provides a sight field of view (S-FOV). The sight may be a magnifying sight or a holographic sight. The sight 5 and device 1 may both be commercial off the shelf (COTS) products. The sight 5 may have a zoom function which allows an object to appear to be moved closer to the user through the sight or move farther from the user.

The ST system 100 may include an augmented reality (AR) imaging system 50 and a training system 30, as will be described in more detail in relation to FIGS. 5A-5B. The ST system 100 may have a training mode where the training system 30 is engaged for training activities. The training may be synthetic or live. The term "synthetic" as used herein includes computer-generated training content using an HMD apparatus. Synthetic training may include computer-generated data (CGD) or content which is displayed by a display device such as a liquid crystal display (LCD), light emitting diode (LED) displays or other display devices interfaced with a control system 117. Synthetic training may include augmented reality training systems. The AR imaging system 50 creates the data representative of the CGD to include alphanumeric text, images, icons, video, graphs, symbols, geometric shapes, holographic images, holographic overlays, etc., capable of being produced and/or displayed by a control system 117 on an interfaced display device. The CGD may include multiple displayed items simultaneously for training and/or situational awareness. The AR imaging system 50 may include templates for creating the synthetic targeting field of view (ST-FOV) indicator (or circle). The AR imaging system 50 may include training scripts for displaying in sequence a series of AR images for targeting stationary objects and moving objects. The AR imaging system 50 may include in-field use templates for displaying situational awareness information or other CGD information.

The ST system 100 may have a non-training mode wherein the sight field of view (S-FOV) is part of the real-world seen in the HMD field of view (H-FOV) for operational purposes and targeting in the field or operational environment, as will be described in relation to FIGS. 8A-8B. The training system 30 may be optional and represented in a dashed box. The training system 30 may be built in the ST system 100 or a separate system. The training system 30 may be selectively used in the field for synthetic training or targeting by the user of the HMD apparatus 20 on demand. The training system 30 may be used for live training exercises.

The ST system 100 may include an HMD-to-sight alignment interface assembly 40. The ST system 100 may include a sight targeting-to-HMD recognition interface 60 being interfaced with an HMD apparatus 20. The HMD apparatus 20 includes at least one HMD lens 115 and will be discussed in more detail in relation to FIG. 2 and FIGS. 4A-4D. The HMD-to-sight alignment interface assembly 40 and the sight targeting-to-HMD recognition interface 60 will be described in more detail in relation to FIG. 3A.

The ST system 100 may include a squad/team/entity tracker 80, as will be described in more detail in relation to FIGS. 5A and 5B. The squad/team/entity tracker 80 may be used in games, training or live operations to track others in a team or squad which may be in proximity to each other for situational awareness. The squad/team/entity tracker 80 may track others (non-team or non-squad) entities in proximity to the ST system 100, as well. Other entities may include, without limitation, communication devices associated with ground-based vehicles, air-borne vehicles, personal computers (PC), mobile telephones, satellite telephones and targets including building, roads and live entities.

The ST system 100 may include a situational awareness creator (SAC) assembly 90. The SAC assembly 90 merges various data streams related to one or more of the orientation of the HMD apparatus 20, the geographical location of the HMD apparatus 20, the orientation of the user's head, the location of others in proximity to the user, video or still images of the environment and a target location to identify situational awareness parameters for augmented reality (AR) imaging within at least one of a sight field of view (S-FOV) and a synthetic targeting field of view (ST-FOV), both of which are best seen in at least FIGS. 8A-8C and FIG. 9A.

The ST system 100 may include a communication system 95. The communication system 95 may include at least one receiver interfaced with the control system 117 as will be described in relation to FIG. 2.

Turning now to the HMD apparatus 20, by way of non-limiting example, a manner of making HMD lenses 115 is described in U.S. Pat. No. 8,781,794, entitled "METHOD AND SYSTEM FOR CREATING FREE SPACE REFLECTIVE OPTICAL SURFACES," by Gregory A. Harrison et al. ('794 Patent), incorporated herein by references as if set forth in full below. The HMD lens may be created using one or more computers to: (i) represent the display surface by display objects; (ii) represent the free space reflective optical surface by surface elements; and (iii) iteratively calculate spatial locations, normals and radii of curvature for the surface elements which will cause a virtual image of each display object to be displayed to a nominal user's eye in a desired direction of gaze of the eye. Nonetheless, other lens configurations may be used and should not be limited to the lens in the '794 Patent.

By way of non-limiting example, the HMD apparatus 20 may include a smart helmet, commercial off the shelf (COTS) HMDs, military helmets or headwear compatible with head mounted displays. The HMD apparatus 20 may include goggles and glasses. The HMD lenses described here may include a free space reflective optical surface. Nonetheless, other optical HMD lenses may be used. Displays 45 integrated into the HMD apparatus 20 display the CGD and/or AR images on the lenses 115.

Figure 2:
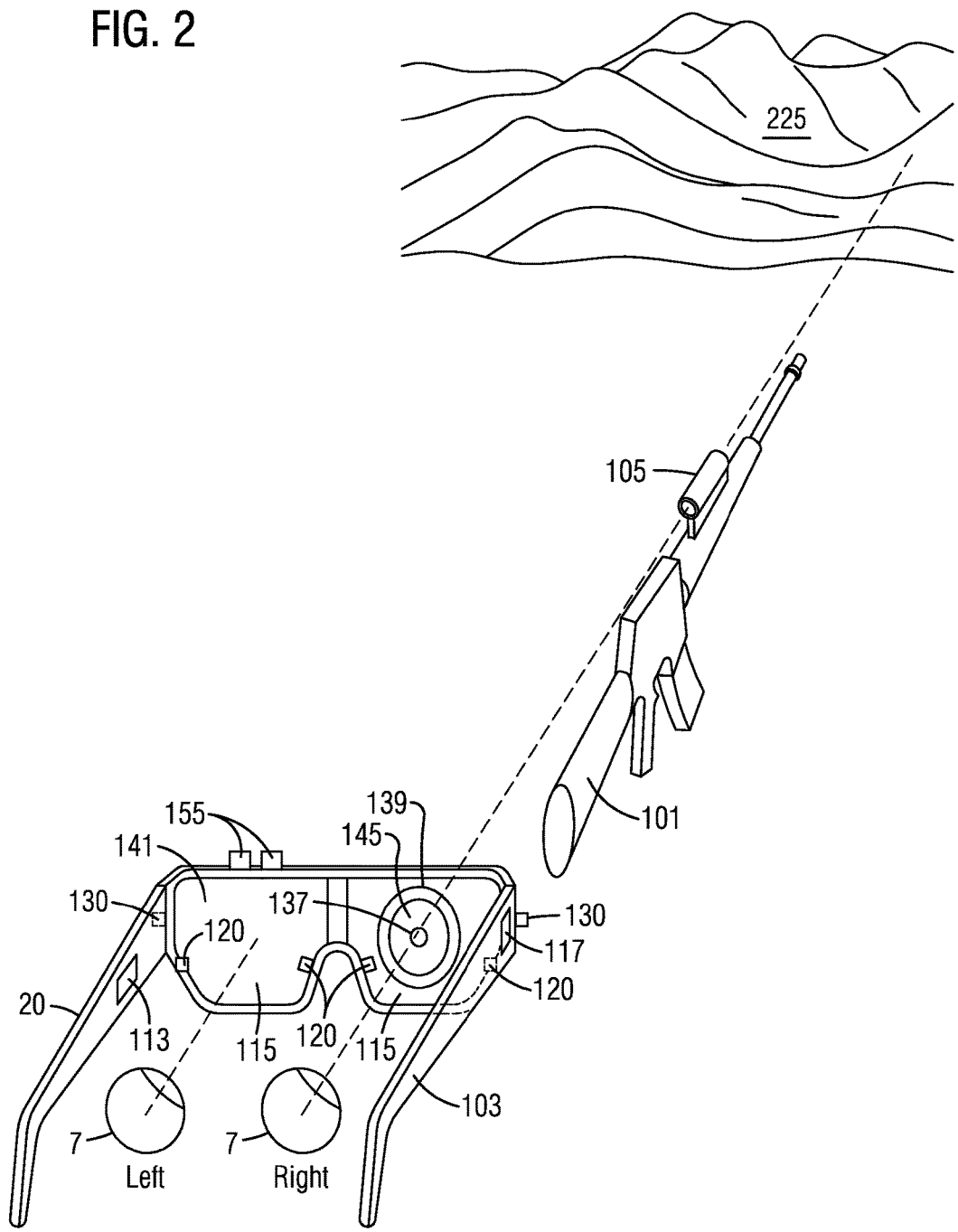
FIG. 2 is a perspective view representation of an ST system with a head mounted display (HMD) apparatus with a representation of head mounted display (HMD) to sight alignment relative to a sight on a hand-held device such as a weapon.

FIG. 2 is a perspective view representation of an ST system with a head mounted display (HMD) apparatus 20 with a representation of head mounted display (HMD) to sight alignment relative to a sight 105 on a hand-held device such as a weapon 101. In FIG. 2, the terrain 225 is the real-world view through lenses 115 of the HMD apparatus. Assume that the sight 105 is in range of the HMD apparatus 20 and, specifically, a user is looking down into and through the sight 105, the user would see a sight dot 137 or sight marker in the real-world view of the sight 105. By way of non-limiting example, the sight 105 may be an Advanced Combat Optical Gunsight (ACOG). The sight 105 may produce a red dot in a light spectrum of −670 nm (nanometers) wavelength, by way of non-limiting example. Other light spectrum wavelengths may be produced in the visible light wavelengths including green and blue depending on the sight. The sight field of view (S-FOV) 145 may have a magnification factor. Hence, the magnified apparent size of objects relative to its distance from the user in the real-world view as seen through the sight would be different from the apparent size of the object relative to its distance from the user when only looking through the HMD lens 115 having no magnification. The sight field of view (S-FOV) may also cause object(s) to appear farther away or close-up depending on a zoom factor or zoom ratio.

The HMD apparatus 20 includes right and left HMD lenses 115 which provides an HMD field of view (H-FOV) 141 in each lens, as also described in relation to FIGS. 4A-4D and FIGS. 8A-8C. The HMD apparatus 20 may include a single lens. HMD field of view (H-FOV) 141 may be limited to the field of view of one lens or both lenses. In an embodiment, the HMD apparatus 20 can be, for example, an optical see-through, augmented reality, binocular viewer. In various embodiments, the ST system 100 (FIG. 1) disclosed herein will use such an HMD apparatus 20, wherein the principles discussed herein are equally applicable to optical see-through, augmented reality, monocular viewers, video see-through, augmented reality, binocular and monocular viewers.

The user when looking though an HMD lens 115 may view a real-world view of the terrain 225 and the sight 105 including a sight field of view (S-FOV) 145, when the sight 105 is in proximity to the lens, and a sight dot 137. The user may also see portions of the device or weapon 101 to which the sight 105 is mounted. The HMD apparatus 20 may include an "optical see-through system," such as disclosed in U.S. Pat. No. 8,678,282, entitled "AIM ASSIST HEAD-MOUNTED DISPLAY APPARATUS" by Black et al., incorporated herein by references as if set forth in full below.

The sight dot or mark may be generated by an internal light emitting diode (LED) or other illuminator of the sight being viewable when looking through or down the sight. Since the user is looking into the sight, the weapon, sight, the sight field of view (S-FOV) 145 and sight dot 137 or sight mark (i.e., reticle display) are part of the real-world view and hence not part of the augmented reality image(s) in some embodiments.

As can be appreciated, a user looking through a sight 101 may use only one eye in an open position to look down and through the sight 105 while the other eye is closed. Thus, in such instances, CGD imaging should only be displayed on the particular HMD lens that is used to view the sight. In such instances, the eye gaze or the information as to whether an eye is open may be used to deploy a synthetic targeting field of view (ST-FOV) 139 in a field around the sight body and sight field of view (S-FOV) 145 on the appropriate lens. In other embodiments, detecting which lens the sight is in-range of may be determined using computer vision.

In the human eye, there are three fields of view which are relevant in terms of providing an optical system which allows a user to view an image generated by an image display system in the same manner as he/she would view the natural world. The smallest of the three fields of view is that defined by the user's ability to rotate his/her eye and thus scan his/her fovea over the outside world. The maximum rotation is on the order of ±50° from straight ahead, so this field of view (the foveal dynamic field of view) is approximately 100°. The middle of the three fields of view is the straight ahead static field of view and includes both the user's foveal and peripheral vision. As discussed above, this field of view (the foveal+peripheral static field of view) is on the order of 150°. The largest of the three fields of view is that defined by the user's ability to rotate his/her eye and thus scan his/her foveal plus his/her peripheral vision over the outside world. Based on a maximum rotation on the order of ±50° and a foveal+peripheral static field of view on the order of 150°, this largest field of view (the foveal+ peripheral dynamic field of view) is on the order of 200°. This increasing scale of fields of view from at least 100 degrees to at least 150 degrees and then to at least 200 degrees provides corresponding benefits to the user in terms of his/her ability to view images generated by an image display system in an intuitive and natural manner. Thus, the HMD field of view (H-FOV) 141 described herein in some embodiments may include a field of view from one of at least 100 degrees, 150 degrees and 200 degrees.

In FIG. 2, the HMD apparatus 20 is represented as a pair of glasses to be worn by a user. For the embodiment shown, the HMD apparatus 20 has a frame 103, illustrated as stems shaped to go over an ear and a nose piece to provide support. As discussed above, the frame may also be in the form of a strap and goggles or other shape suitable for supporting the HMD lenses 115 in an established relationship with one or both eyes 7 of a user.

In one embodiment, the HMD apparatus 20 may be an augmented reality device, e.g., an optical see-through device with a see-through viewing area (i.e., lenses 115) provided for each eye of the user, whereby the user can view actual (natural) terrain 225 within his/her forward field of view. The ST system 100 (FIG. 1) interfaced with the HMD apparatus 20 is configured to superimpose virtual objects or images on the real world viewable through the viewing area (i.e., lenses 115). In one embodiment, the virtual objects may be two-dimensional (2D) objects or three-dimensional (3D) objects. The HMD apparatus may display text, icons or other computer-generated data (CGD) or digital content in the HMD field of view, as will be described in relation to FIGS. 8A-8C.

The HMD apparatus 20 may have mounted thereon at least one of a plurality of eye tracking sensors 120 and a plurality of forward-facing (sight detector) sensors 130. The sensors 120 and 130 may be cameras. The plurality of forward-facing sensors 130 may be mounted to face forward to capture the real-world view of the in-range device (i.e., weapon 101) and sight 105. The plurality of eye tracking sensors 120 are mounted in proximity to the user's left and right eyes 7 and located to capture data related to the user's gaze direction, eye features and/or other face marking.

In one embodiment, at least one receiver 113 as part of the communication system 95 may be incorporated in the HMD apparatus 20. For example, processing can be performed in control system 117. A processor may also be separate from the HMD apparatus, e.g., the processor can be configured to be worn or attached to the clothing or body of the user. The at least one receiver 113 may be compatible with Bluetooth technology or other wireless communication protocols. The at least one receiver 113 may receive communications from team or squad members, for example. The at least one receiver 113 may receive other network information using various wireless communication protocols.

In one embodiment, the HMD apparatus 20 includes one or more gyroscopes and/or accelerometers 155, supported by frame 103, to provide orientation information regarding the HMD apparatus 20. The orientation information may be used in conjunction with absolute geospatial position coordinates or information regarding the HMD apparatus to correlate the view of the terrain or real world with the sensed device's orientation and thereby properly position augmented reality images (i.e., CGD).

The orientation information can comprise x, y, and z positional coordinates and angular orientation coordinates (such as roll, pitch and yaw) of the viewing area in one embodiment. In further embodiments, the information may be in the form of radial coordinates, aspherical coordinates or other types of coordinates. The information may also take the form of quaternions, cosine matrices, Euler angles and others.

The absolute geospatial position coordinates may be provided by an embedded global positioning system (GPS) (not shown) in the HMD apparatus 20, or in an external mechanism which calculates the position of the HMD apparatus. At least one camera 130 may be used to provide image information which may be used to calibrate the orientation information to ensure that the information correlates well to the terrain being viewed. Such calibration may account for normal drift inherent in gyroscopes.

The GPS may be a Global Positioning System (GPS)-Aided Inertial Navigation System (INS) (not shown) that comprises both a GPS and an INS. An INS is a navigation system that uses a computer, motion sensors (accelerometers) and rotation sensors (gyroscopes) to continuously calculate via dead reckoning the position, angular orientation and velocity (direction and speed of movement) of a moving object without the need for external references. A GPS is a navigation system that uses satellites to act as reference points for the calculation of position location. The INS can comprise accelerometers and gyroscopes that can augment position data from the GPS. The HMD apparatus 20 can thus have orientation data for all six degrees of freedom of the HMD apparatus 20 including three degrees of angular orientation (roll, pitch and yaw) and three degrees of position (x, y and z).

The orientation information may include absolute geospatial position coordinates or information regarding the device 1 (FIG. 1) or weapon 101 which can be used to correlate the real-world view provided by HMD apparatus with the sensed device and/or sight location absolute geospatial position information and thereby properly position the AR imagery, as will be described in more detail in relation to FIGS. 8A-8C. The orientation information can comprise x, y and z positional coordinates and angular orientation coordinates (such as, roll, pitch and yaw) in one embodiment.

Cameras or sensors 130 on the HMD apparatus 20 may be used to provide image information which may be used to calibrate the orientation information to ensure that the information correlates well to the terrain being viewed in, for example, a see-through viewing area of lenses 115 of an augmented reality embodiment. Other cameras may be mounted to the HMD or user to be used to provide video capture of targets, the real world or other raw situational awareness information.

The orientation calculations may be performed by a processor on the HMD apparatus 20, e.g., a processor that is a part of control system 117, or a processor may be provided which is separate from the HMD apparatus 20. Wherever the processing is performed, ultimately the synthetic targeting field of view (ST-FOV) 139 and any CGD are displayed by the HMD apparatus, specifically, by the driver of control system 117, at a position relative to the sight field of view (S-FOV) 145 and sight dot 137 of the sight 105 in the viewing area (i.e., HMD field of view (H-FOV) 141) of at least one lens 115. The eyes 7 are denoted as left and right.

In one embodiment, the head mounted display (HMD) apparatus may include at least one gyroscope which provides updated orientation information at a frequency of at least approximately 60 Hz. In further embodiments, the gyroscope update may be performed at a slower rate and still operate well if it uses dead reckoning to update positioning with velocity and acceleration information. In some embodiments, a slower update rate may be used with different mathematical processing such as Kalman filters or dead reckoning using velocity and acceleration. Information from one or more accelerometers may also be used. The updated orientation information improves the ability of the HMD apparatus to display correctly aligned computer-generated data or augmented reality (AR) images.

In some embodiments, a user can link their HMD apparatus physically, such as via a wired or wireless link, with a local vehicle or established reference point that allows the HMD's internal inertial reference system (when used) to calibrate to a known location and angular orientation before a duration of operation in the field. This duration of operation in one embodiment is less than the duration it takes for the internal inertial reference system, composed of the gyroscopes, accelerometers and a processor, to drift outside of a nominally useful error band.

In an augmented reality HMD apparatus, the viewing area may include a beam splitter. The sight field of view (S-FOV) 145 and sight dot 137 of the sight are viewed through the lens as part of the real-world view. The viewing area of the HMD apparatus may be configured as a transparent display that allows light from the terrain or real world to pass through glass or a lens of the viewing area to the eyes 7 of the user. The viewing area of the HMD apparatus also allows light from the sight field of view (S-FOV) 145 to pass through the glass into the eyes of the user.

As discussed above and illustrated in FIG. 2, the device 1 (FIG. 1) may be a weapon 101 with the sight 105 and the HMD apparatus 20 separate from each other and independently moveable.

Figure 3A:
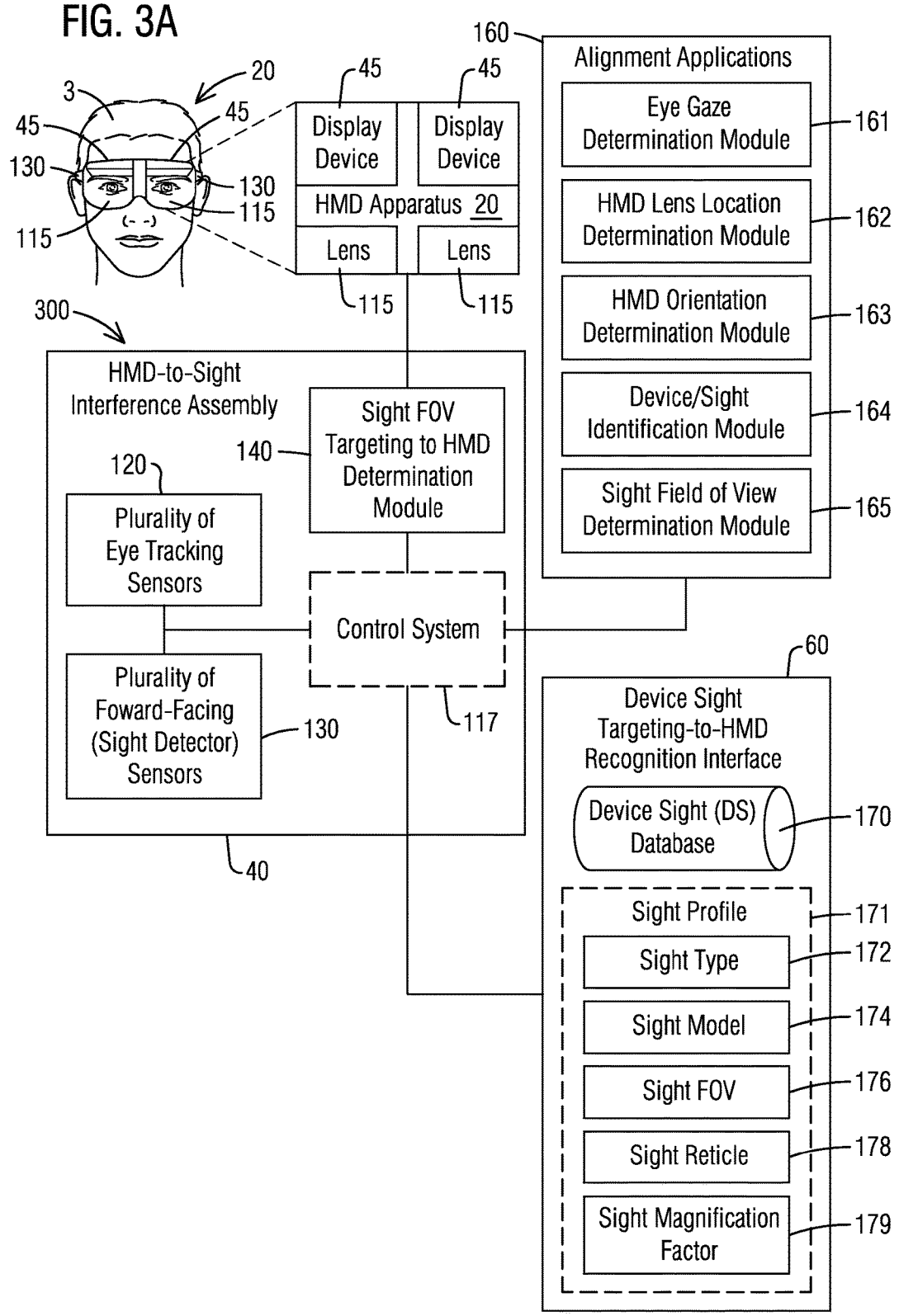
FIG. 3A illustrates a block diagram of an HMD-to-sight alignment sub-system.

FIG. 3A illustrates a block diagram of an HMD-to-sight alignment sub-system 300. The sub-system 300 may include the HMD-to-sight interface assembly 40 and a device-sight targeting-to-HMD recognition interface 60. The interface assembly 40 may include or be interfaced with at least one of a plurality of eye tracking sensors 120 and a plurality of forward facing (sight detector) sensors 130. The interface assembly 40 may include a sight FOV targeting to HMD determination module 140. The interface assembly 40 may include or be interfaced with control system 117, denoted in dashed lines, which may be shared with the HMD apparatus 20. The interface assembly 40 is configured to interface with a head-worn display device such as HMD apparatus 20. The HMD apparatus 20 may include a head mounted display (HMD) integrated into goggles, helmet or other head-worn gear.

The interface assembly 40 may include or be interfaced with device-sight targeting-to-HMD recognition interface 60. The interface 60 is configured to register a device-sight in proximity to the HMD apparatus 20. The plurality of forward-facing sensors 130 may determine when a sight is within range of the HMD apparatus 20. In some embodiments, the plurality of forward-facing sensors 130 may include depth sensors to detect depth parameters when modeling the sight. The forward-facing sensors 130 may include red, green, blue (RGB) sensors. The forward-facing sensors 130 may include infrared sensors and/or depth sensors. The forward-facing sensors 130 may include sensors which operate in varying ambient lighting settings including indoor lighting and outdoor lighting. The varying ambient lighting may include dawn, dusk, daylight and night time.

When the sight is within range of the HMD apparatus 20, the ST system 100 (FIG. 1) may begin the process for sight FOV targeting to HMD determination as performed by the module 140. Unless the sight is within range, one or more systems, subsystems, interfaces, etc., of the ST system 100 (FIG. 1) may be disengaged. In some embodiments, the sight is in range when detected to be in front of or in close proximity to one of the HMD lenses 115. The sensors, control system, communication system of the ST system 100 (FIG. 1) may remain active.

The ST system 100 (FIG. 1) may also receive or have stored information related to the type of device or weapon. The device or weapon orientation data may be determined and correlated to the terrain being viewed by ST system 100 (FIG. 1), such as by other electronic calculating device in the at least one receiver 113 of the communication system 95 (FIG. 1) or the control system 117, or may be separate from the at least one receiver and the control system. The sight orientation data may be determined and correlated to the terrain being viewed by ST system 100 (FIG. 1), such as by other electronic calculating device in the at least one receiver 113 or the control system 117, or may be separate from the receiver and the control system.

The device sight targeting-to-HMD recognition interface 60 may include a device sight (DS) database 170. The device sight (DS) database 170 may include stored information related to three-dimensional (3D) or two-dimensional (2D) sight models and device models from different perspective views or orientations. The interface 60 may include a plurality of sight profiles 171. Each sight profile 171 may include sight information relating to a sight type 172 which may identify whether the sight is red, green or blue dot sight, by way of non-limiting example. The sight type may also be holographic or infrared. The sight profile 171 may include a sight model including different orientations and manufacturer 174. The sight profile 171 may include a sight's field of view data 176 including dimensions. The sight profile 171 may include information related to the sight reticle 178, mark or sight dot. The sight profile 171 may include information related to the sight's magnification factor 179. The sight magnification factor allows computer generated data (CGD) to be displayed at the proper magnification level within the sight field of view (S-FOV) 145 relative to the magnification factor and sight orientation. Additionally, some sights may have a zoom function which allows the user to change a zoom ratio or factor to change the appearance an object to look closer to the user or farther away.

The optical sight may have multiple magnification factor settings. The user may enter or select a sight magnification factor setting associated with the magnification setting of the sight currently used via the HMD apparatus for entry in the sight profile 171. Likewise, a zoom factor or ratio setting may be entered or selected from a list of setting options specific to a zoom factor or ratio setting currently used for entry in the sight profile 171. In some embodiments, the ST system 100 (FIG. 1) may determine the magnification factor using the forward-facing sensors 130 or other camera sensors by comparing the captured real-world view of the HMD lens to the captured real-world view of the sight. By way of non-limiting example, the user may enter a selection by use of eye gaze detection. The HMD apparatus may display the settings to the user for selection of the current setting or setting to be used on the sight. In some embodiments, a current setting may be pre-stored such as for training purposes. In some embodiments, the current setting may be entered using a graphical user interface on a computing device in communication with the HMD apparatus.

The control system 117 may be dedicated to the interface assembly 40 or may be shared by the HMD apparatus 20 and with other components, systems, assemblies or subsystems of the ST system 100 (FIG. 1). The HMD-to-sight alignment sub-system 300 may include HMD-to-sight alignment applications 160.

The HMD-to-sight alignment applications 160 may include an eye gaze determination module 161, HMD lens location determination module 162, an HMD orientation determination module 163, weapon/sight determination module 164 and sight field of view (S-FOV) determination module 165.

The eye gaze determination module 161 processes the eye-tracking sensor data from the plurality of eye tracking sensors 120 to determine the direction of gaze of the user's eyes. By way of non-limiting example, the gaze direction may be determined by tracking glint on the cornea of the eyes of user 3. The gaze direction may include pupil tracking. By way of non-limiting example, eye tracking technology may be commercially off the shelf (COTS) eye tracking technology.

The operational field of view of the human eye (dynamic field of view) varies since the eye can rotate about its center of rotation, i.e., the human brain can aim the human eye's foveal+peripheral field of view in different directions by changing the eye's direction of gaze. For a nominal eye, the vertical range of motion is on the order of 40° up and 60° down and the horizontal range of motion is on the order of ±50° from straight ahead. For an exit pupil of the size produced by the types of optical systems previously used in HMDs, even a small rotation of the eye would substantially reduce what overlap there was between the eye's static field of view and the exit pupil and larger rotations would make the image disappear completely. Although theoretically possible, an exit pupil that would move in synchrony with the user's eye is impractical and would be prohibitively expensive. The eye gaze determination module 161 may track the movement or angle of the eye of user 3 as it moves.

The HMD lens location determination module 162 may determine the HMD lens location to overlay the CGD relative to the synthetic training field of view (ST-FOV) 139 (FIG. 2), sight field of view (S-FOV) 145 (FIG. 2) and sight dot 137 (FIG. 2) of the sight when looking through the sight. The HMD orientation determination module 164 may include the HMD orientation information generated by the or more gyroscopes and/or accelerometers 155 of the HMD apparatus 20. The HMD orientation information may be generated by the HMD apparatus 20 or ST system 100 (FIG. 1), as the ST system 100 may share information collected by the HMD apparatus 20. The HMD orientation information may comprise x, y and z positional coordinates and angular orientation coordinates (such as roll, pitch and yaw) of the viewing area in one embodiment. In further embodiments, the information may be in form of radial coordinates, aspherical coordinates or other types of coordinates. The information may also take the form of quaternions, cosine matrices, Euler angles and others.

The alignment applications 160 may include a device/sight identification module 164. The device or weapon orientation may be generated as will be described in more detail in relation to FIG. 11. The weapon identification may also be determined. The device/sight identification module 164 may determine the sight profile for use in the alignment as determined by the recognition interface 60 and orientation. The device/sight identification module 164 may initiate the plurality of sensors 130 to capture a sight model image mounted to the device or weapon. The device identification may be needed to distinguish the sight body and orientation relative to the device body. The device/sight identification module 164 models the sight body for looking up a match in the device sight (DS) database 170. Once the sight model body match is found, the sight profile data corresponding to the model boy may be used by the sight field of view (S-FOV) determination module 165.

The sight field of view (S-FOV) determination module 165 retrieves the data of the sight from the recognition interface 60 based on the match and the current orientation of the sight. The sight field of view (S-FOV) determination module 165 may extrapolate the sight field of view (S-FOV) 145 relative to the sight body or housing as viewed through the HMD field of view (H-FOV) 141. The sight reticle location and/or the sight dot 137 may be extrapolated so that the ST system 100 (FIG. 1) can generate the CGD relative to the synthetic targeting field of view (ST-FOV) 139, the sight field of view (S-FOV) 145 and the sight dot or sight reticle.

The sight field of view (S-FOV) through the lens 115 of the HMD apparatus 20 is determined by the sight FOV targeting to HMD determination module 140 for alignment and display generation of a synthetic targeting field of view (ST-FOV) 139 (FIG. 2). In some embodiments, the sight field of view (S-FOV) 145 includes that portion within the lens 115 corresponding to the optical path of the sight through which a real-world view (with or without magnification) is visible to the eye of the user 3. The sight field of view (S-FOV) 145 (FIG. 2) may exclude the sight's body or housing of the sight surrounding the S-FOV 145 so that any CGD location may overlay the CGD over the area corresponding to the sight's body or housing, as appropriate. Furthermore, in some embodiments, the perspective or orientation of the sight body is also taken into consideration so that as targets, entities or other objects are viewed, the perspective of the sight body may be used to adjust positioning of AR images or provide situational awareness information which may be obscured by a perspective of the device or sight body. The sight FOV targeting to HMD determination module 140 determines the location of the sight relative to the area of the lens 115 to display the synthetic targeting field of view (ST-FOV) 139 (FIG. 2) represented as a border surrounding the sight body.

Furthermore, the CGD may be displayed in a manner which renders the CGD visible over the color, shape and/or texture of the sight body or housing. For example, if the sight housing is black, black text or black CGD may not be visible if displayed at a location overlapping the housing of the sight viewed through the HMD field of view (H-FOV) 141 (FIG. 2). Thus, the ST system 100 (FIG. 1) is configured to determine a location of an HMD lens 115 at which any CGD may be displayed by a display device 45 and visible relative to the real-world view. As for the sight, many users 3 close one eye so that only one lens is available for both looking through the sight and display of CGD.

The determination module 140 may generate the images for overlay in the HMD apparatus 20 based on at least one of the current weapon orientation, the current sight orientation, data from the sight profile relative to the current HMD orientation and the determined synthetic targeting field of view (ST-FOV) 139 (FIG. 2). Other data may be used by the determination module 40 including the viewing area of the lenses 115 and/or the eye gaze direction. In some embodiments, the exact size and shape of the sight field of view (S-FOV) lens may be used. The determination module 140 may generate the images for overlay in the HMD apparatus 20 based on training modes, training objects and other operational settings of the HMD apparatus 20, such as in field use. The output of the sight FOV targeting to HMD determination module 140 is sent to the display device 45 of the HMD apparatus 20 for display in the lens 115 corresponding to the proximity of the detected sight.

As discussed below, in various embodiments, visual recognition of the weapon's orientation can be obtained from one or more cameras carried by the HMD apparatus 20. As also discussed below, orientation data is also obtained for the HMD apparatus 20 and, in particular, the viewing area which the HMD apparatus provides to the user. This device and HMD orientation data, as well as data regarding the sight field of view data and sight orientation, are processed via a processor or other circuitry and then one or more of the synthetic targeting field of view (ST-FOV) 139 (FIG. 2) and CGD, relative to the sight field of view (S-FOV) 145 and sight dot 137 of the sight in the real-world view through the HMD field of view (H-FOV) 141 for the current orientation of the weapon and HMD apparatus, is displayed at the appropriate location in the HMD's current viewing area as augmented reality imagery. In some embodiments, CGD may be displayed within the sight field of view (S-FOV) at a corresponding magnification level for the magnification factor of the sight.

The HMD apparatus may operate in inclement weather and total darkness.

Figure 3B:
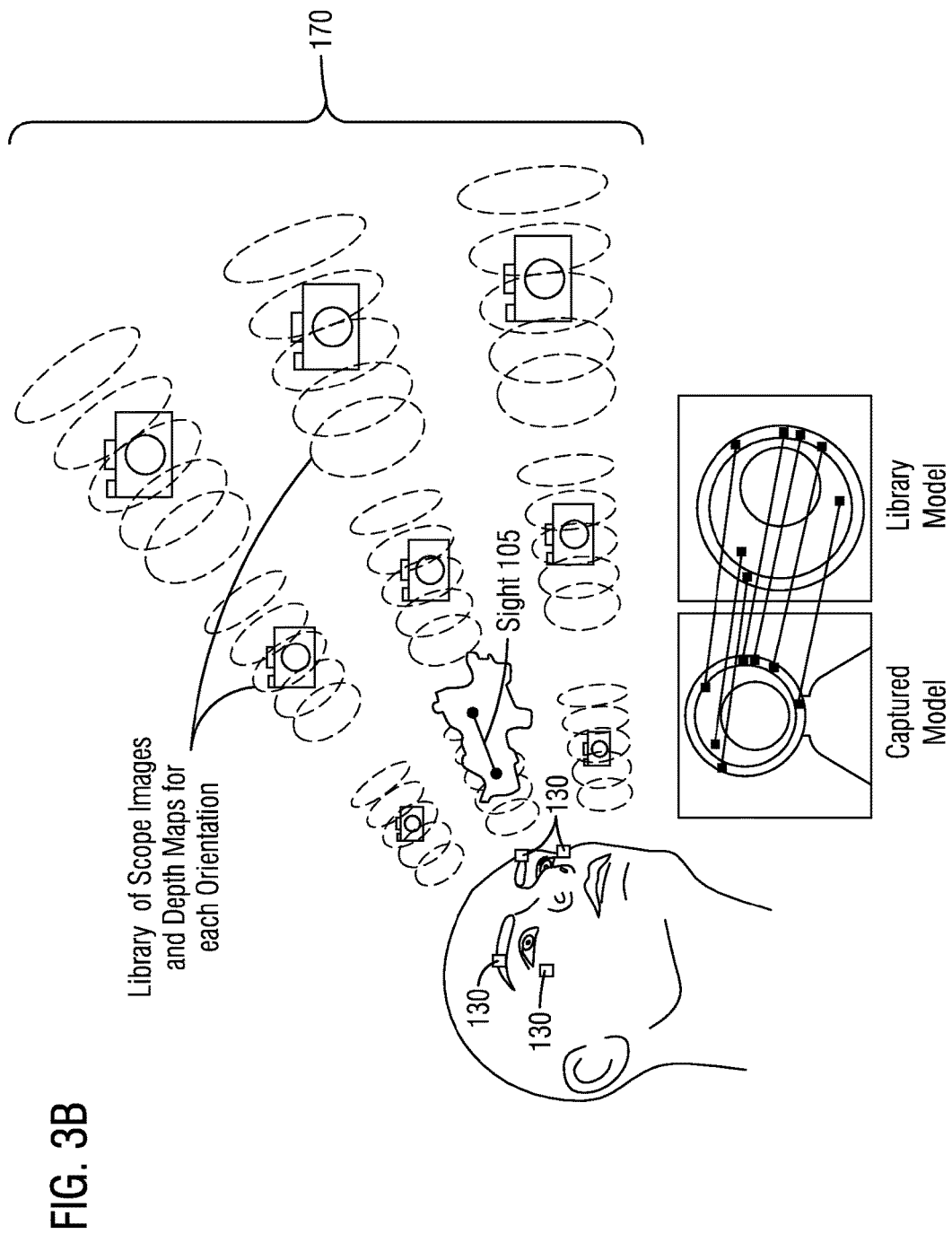
FIG. 3B illustrates a schematic of a user's perspective, optical sight and sight library.

FIG. 3B illustrates a schematic of a user's perspective, optical sight and sight library. The schematic shows the mechanism of translating what is being recorded by the forward facing (sight detector) sensors 130 (FIG. 2) into a captured model that can determine the orientation (rotation, translation) of a scope or sight. This may be accomplished by a compositional network that makes use of visual data, historical location data, user-specific historical information and contextual information. The network would include hand-written rules or learned models or continually learning models to improve the accuracy of the placement. This model may be trained on a mix of depth maps, 3D models and sensor inputs that are mounted on the HMD apparatus before deployment of a system. The models may be calibrated by placing the scope in appropriate locations to account for new or varying lighting conditions or use of new/upgraded sensors. The 3D model may also make use of calibration metadata from individual sensors.

Certain scope elements may be configurable (sensor caps/flip caps) so the model may also account for the location/orientation/state of these configured modules to determine orientation, but also HMD rendering. The sight models may be stored in an onboard library (database 170) of models/data/images/depth data. The HMD apparatus or ST system 100 (FIG. 1) may also update these libraries as new sights are manufactured.

In some embodiments, an HMD apparatus may have a limited library of sights in database 170. For example, a user in training may have access to a limited set of sights. The stored sight models and different orientations of the models may be compared with the captured model. The comparison may include point-to-point matching. If the sight is for telescopes, the library of sights in database 170 may be limited to sights compatible with telescopes, for example. If the sight is for cameras, the library of sights in database 170 may be limited to sights compatible with camera or image capturing devices, for example.

FIG. 4A illustrates a side view of an arrangement of the plurality of eye tracking sensors 120 and the plurality of forward-facing (sight detector) sensors 130 mounted to the HMD apparatus 20 and relative to the HMD lens 115. The HMD apparatus 20 includes at least one display device 45. The one or more forward-facing sensors 130 may be mounted to a housing of the HMD apparatus 20. The one or more eye tracking sensors (i.e., sensors 120) per eye may be directed toward the face or eyes 7 of the user and mounted to the housing of the HMD apparatus 20. The HMD housing may include a frame, nose bridge or portion of the HMD lens.

The lines 430 represent the field of view of the at least one forward facing sensor 130 to detect a body of the sight 105 and device (not shown) in proximity to lens 115 in the real world. In this example, the lens 115 is for the right eye 7. A separate lens may be provided for the left eye. In some embodiment, the HMD lens 115 may be one lens with right and left lens portions. The lines 420 represent the direction of sensing by the eye tracking sensors 120. The placement of the sensors will be based on the number of sensors and type of sensors. The placement shown in the illustrations should not be limiting in any way.

The eye tracking sensors 120 are configured to track the direction in which the eyes are pointing, while the forward-facing sensors 130 detect the presence of a scope or sight 105 in the field of view of the forward-facing sensors 130. The eye tracking sensors 120 monitor the eye 7 through various techniques including, but not limited to, the sensing of the position of the pupil with respect to the rest of the eye 7.

The plurality of eye tracking sensors 120 may include near infrared sensors or cameras (NIR), visible and near infrared sensor cameras (VNIR) configured to sense an eye gaze direction of the user. The plurality of eye tracking sensors 120 may include at least one eye tracking sensor 120 for each eye 7. The eye tracking sensors 120 may include infrared cameras mounted to the HMD frame in proximity to the left eye and which sense in the direction of the user or rearward relative to the HMD frame. The eye tracking sensors 120 may include first and second right eye tracking sensors. The first and second right eye tracking sensors may include infrared cameras mounted to the HMD frame in direction of the right eye and which sense in the direction of the user or rearward relative to the HMD frame.

Referring also to FIG. 4B, a side view of the arrangement of FIG. 4A with collimated light 470 from the sight 105 relative to the arrangement is shown. The collimated light 470 represents the real-world view seen by the eye 7 when looking through the optical lens or along the optical path of the sight 105. The lines 420 and 430 have been removed to simplify the illustration of FIG. 4B.

Referring also to FIG. 4C, a side view of the arrangement of FIG. 4B with information (i.e., CGD) being displayed by display device 45 of the HMD apparatus 20 at a CGD location 488 in the synthetic targeting field of view (ST-FOV) 139 outside of the sight field of view (S-FOV) 145 is illustrated. In this example, the synthetic targeting field of view (ST-FOV) is represented to include the areas in the lens 115 that is between line 139U and line 139L. The "U" and "L" denote upper and lower boundaries of the synthetic targeting field of view (ST-FOV) 139. The synthetic targeting field of view (ST-FOV) 139 is formed by an ST-FOV indicator which may be represented as a boundary line. This boundary line would be generated by the display device 45. However, to simplify the drawing, those lines from the display device 45 have been omitted. The CGD location 488 may be above, below or to the side of the sight field of view (S-FOV) 145. The CGD location 488 may be displayed up to 360 degrees around the sight field of view (S-FOV) 145 and within the frame of the synthetic targeting field of view (ST-FOV) 139. The lines 495 represent the light of the display device 45 being directed directly or indirectly toward the HMD lens 115 at the location for the CGD to be displayed.

Text, digital content or other computer-generated data (CGD) may be displayed by overlaying the CGD on the viewing area (i.e., lenses 115). Such overlaying may be accomplished using a suitable driver which is part of the HMD apparatus's control system 117 (FIG. 2). The driver may be a software-controlled mechanism for displaying information in the viewing area such as that used to overlay information in augmented reality HMD apparatuses.

As discussed above, combining a real-world view with a virtual object or image (i.e., CGD) can be done by reflecting the virtual object or image from a partially reflective mirror (beam splitter) and viewing the real world directly through the mirror. As also discussed above, combining a real-world view with a virtual object or image can also be done electronically by accepting video of a real-world view from at least one sensor 130 or other forward-facing sensor and mixing it electronically with the virtual object or image. In one embodiment, the at least one sensor 130 or other forward-facing sensors may take real-time video of the real world or terrain and provide such real-time video to the viewing area (i.e., HMD field of view (H-FOV) 141) of the HMD apparatus.

In an embodiment, the virtual object or image (i.e., CGD) is aligned/registered with the real-world view of the sight field of view (S-FOV) 145 before being displayed to the user in the viewing area (i.e., lenses 115). Otherwise the real-world view of the sight field of view (S-FOV) 145 and the view of the virtual objects/images may be offset in position relative to one another, which can confuse the user. For example, such confusion can occur where a real and a virtual image contain the same scene, and features of the scene appear in different places in the field of view of the user through the HMD apparatus. The alignment/registration of the real-world view of the scope with virtual objects/images (i.e., CGD) generated by a processor can be performed by correlating the virtual objects/images to the real world based on the position and/or orientations of the HMD apparatus being worn by a user and the sight markers. For example, during a training mode, the virtual objects/images or augmented reality images (i.e., CGD) should be sized or calibrated in size and shape relative to the sight field of view so that the CGD has a natural appearance or that a natural anatomic shape is experienced when looking through the sight.

Referring also to FIG. 4D, the side view of the arrangement of FIG. 4C with information being displayed in the synthetic training field of view (ST-FOV) 139 and an eye gaze region of interest (EG-ROI) frame 412 by an HMD apparatus is illustrated. In FIG. 4D, an eye gaze region of interest (EG-ROI) frame 412 is represented for illustrative purposes aligned with the sight dot 137 of the sight 105 and will be discussed in more detail in relation to FIG. 8C. The CGD location 488 may be above, below or to the side of the EG-ROI frame 412. The CGD location 488 may be displayed up to 360 degrees around the EG-ROI frame 412 and within the synthetic targeting field of view (ST-FOV) 139. The lines 495 represent the light of the display device 45 being directed directly or indirectly toward the HMD lens 115 at the location for the CGD to be displayed. The lines 496 represent the light of the display device 45 being directed directly or indirectly toward the HMD lens 115 at the location to form the EG-ROI frame 412 in the sight field of view (S-FOV) 145 to be displayed to the user.

Figure 6:
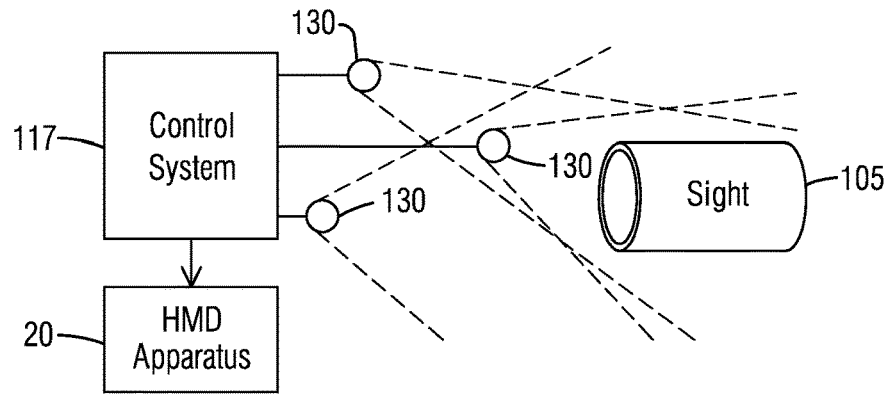
FIG. 6 illustrates a schematic diagram of forward-facing (sight detector) sensors for modeling the sight.

FIG. 6 illustrates a schematic diagram of the forward-facing sensors modeling. The forward-facing sensors 130 may be coupled to the control system 117 or processor. The sensors 130 capture the body of the sight 105 in a way to develop a 2D or 3D model or point cloud of the sight 105. The control system 117 is shown coupled to the HMD apparatus 20. The plurality of forward facing sensors 130 relative to the head mounted display (HMD) apparatus 20 may include red, green, blue (RGB) sensors. The plurality of sensors 130 may include at least one RGB sensor 130 mounted to the HMD frame and which sense forward in the direction of the real-world, away from the eyes. The plurality of sensors 130 may capture a point cloud of the weapon and/or sight. The HMD lens 115 is represented as a curved surface. The plurality of sensors 130 may include depth sensors, infrared sensors or night-vision sensors/cameras. The sensors herein may be cameras.

The forward-facing sensors 130 are sometimes referred to as sight detector sensors and may also be mounted on the HMD apparatus. The sight detector sensors are used to sense the presence of a scope in front of the left or right eye. The field of view of the sensors is represented by the dashed lines radiating from the sensor. The orientation and position of the scope is obtained by analysis of the camera images, as previously discussed with reference to FIG. 3B. The body or housing of the scope is within the sensing area of the sensor's FOV in this figure, and the location and orientation of the camera is known with respect to the HMD apparatus and HMD lens. The location of the HMD is known with respect to the real-world and hence the scope pointing direction and location can be determined with respect to the real-world.

Figure 5A:
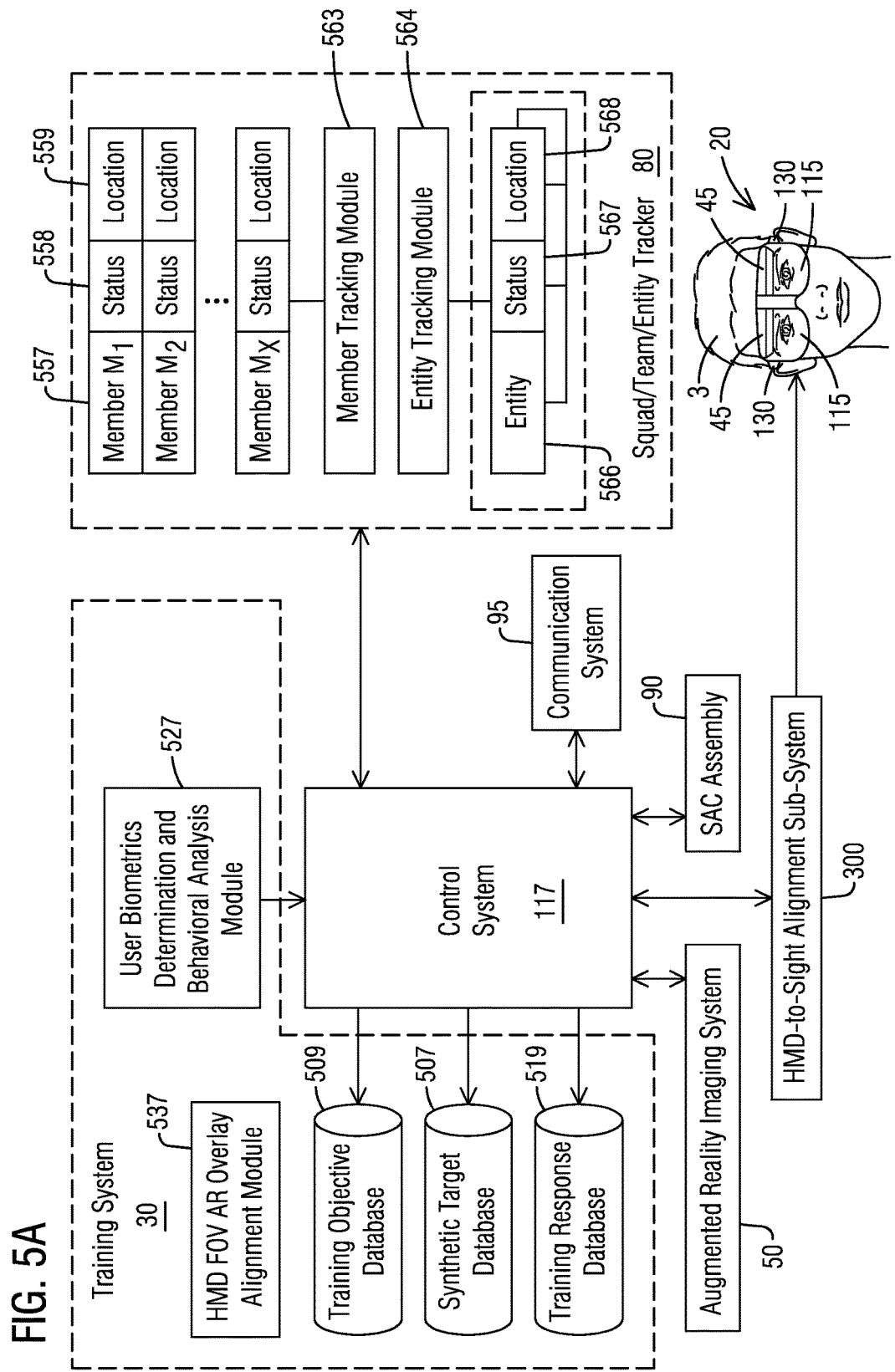
FIG. 5A illustrates a block diagram of the training system and squad/team/entity tracker.

FIG. 5A illustrates a block diagram of the ST system (i.e., ST system 100 of FIG. 1) with the training system 30 operational. The ST system (i.e., ST system 100 of FIG. 1) comprises a control system 117 or processor. The control system 117 may be shared with the processors of the HMD apparatus 20 or a separate processor. The training system 30 may include a database of training objectives 509 and a database of synthetic targets 507. The synthetic targets 507 may include different target types, shapes and distances relative to the viewer. The training system 30 may include database of training responses 519 to add to the challenge of the training objective.

The training system 30 may include a user biometrics determination and behavioral analysis module 527. The plurality of eye tracking sensors 120 (FIG. 2 or FIG. 3A) may also be used to capture biometric parameters to perform a behavioral analysis during training such as the user response immediately before or immediately after engaging a target with a weapon. The biometric parameters may include, without limitation, face movements, iris patterns, etc. Based on currently measured biometrics, including behavioral or cognitive biometrics, during training the stress level of the user may be selectively increased through the use of augmented reality imagery superimposed in the HMD field of view (H-FOV) 141 (FIG. 2), the synthetic targeting field of view (ST-FOV) 139 (FIG. 2) or the sight field of view (S-FOV) 145 (FIG. 2) to achieve or invoke a certain training response by the user. The training system 30 may be interfaced with the augmented reality (AR) imaging system 50 and the situational awareness creator (SAC) assembly 90. The operations of the SAC assembly 90 is described in more detail in relation to FIG. 18.

The training system 30 may include an HMD field of view (H-FOV) 141 (FIG. 2) to augmented reality (AR) overlay alignment module 537. The alignment module 537 will overlay one or more AR images or targets from the AR imaging system 50 into at least one of the HMD field of view (H-FOV) 141 (FIG. 2), the synthetic targeting field of view (ST-FOV) 139 (FIG. 2) or the sight field of view (S-FOV) 145 (FIG. 2). The one or more AR images from the AR imaging system 50 may be moved relative to the HMD field of view (H-FOV) 141 (FIG. 2), the synthetic targeting field of view (ST-FOV) 139 (FIG. 2) or the sight field of view (S-FOV) 145 (FIG. 2) in response to movement of the user's head, the HMD apparatus, the sight orientation and the device orientation. The one or more AR images from the AR imaging system 50 may be moved relative to the HMD field of view (H-FOV) 141 (FIG. 2), the synthetic targeting field of view (ST-FOV) 139 (FIG. 2) or the sight field of view (S-FOV) 145 (FIG. 2) in response to a movement path of at least one target relative to the real-world view or user 3.

The AR image from the AR imaging system 50 may also include an image overlaid on at least one lens 115 using display devices 45 of the HMD apparatus 20 in the current sight field of view (S-FOV) of a sight being used by the user with reticle and/or sight dot for conducting training on the fly by the user, for example. For example, in some embodiments, when a synthetic target is obscuring a crosshair, reticle or other sight mark, the obscured mark may be augmented, highlighted or generated in a manner which is viewable by the user 3 through any augmented reality images.

The training system 30 is interfaced with the HMD-to-sight alignment sub-system 300 wherein the training system 30 is configured to overlay AR images, in the sight field of view (S-FOV), being displayed by the HMD apparatus 20. As described previously in relation to FIG. 2, sight images are captured by the forward-facing sensors 130 to determine the sight profile. The operation of the HMD-to-sight alignment sub-system 300 has been described in relation to FIG. 3A and does not need to be repeated.

The training system 30 is shown interfaced with the squad/team/entity tracker 80. The squad/team/entity tracker 80 may be used during training or tactical (in-the-field) use for creating situation awareness information by the SAC assembly 90. The squad/team/entity tracker 80 may include a member tracking module 563 and/or an entity tracking module 564.

The member tracking module 563 may track and record in memory a member's identification (ID) 557, member status 558 and/or member location 559. The member tracking module 563 may be configured to track a set of communication devices associated with team members or squad members. A member's location data may be generated by each member's system or HMD apparatus. The member data record may be used to provide situational awareness to the user in the form of a sight map (FIG. 8B). The SAC assembly 90 may generate a map that includes AR images, indicators, icons or text to represent a member in proximity to the user.

Other entities or targets may be located by an entity tracking module 564 and indicated in the map generated by the SAC assembly 90. The entity tracking module 564 may receive an entity data 566, entity status 567 and entity location 568. By way of example, the entity data 566, entity status 567 and entity location 568 may be received from an external communication device, or other team or squad members via communication system 95. In some embodiment, the entity data 566, entity status 567 and entity location 568 may be received or derived from the entity or an entity's communication device.

For example, anyone in the environment with a communication device of some type may be located so that the location is provided to the user as CGD. The situational awareness creator (SAC) assembly 90 may generate situational awareness information related to identified and tracked entities or targets identified and tracked by one user and correlated based on information from another team or squad member, as will be described in more detail in relation to FIGS. 8A-8C. Some situational awareness information may not be relevant for all team members or squad members. A team leader may receive information on all team members or squad members while non-leaders receive information on members in close proximity. The description of FIG. 5A may be applied to the ST system in an in-field use or non-training mode. In a non-training mode, one or more components of the training system 30 may be deactivated while the SAC assembly 90, AR imaging system 50, squad/team/entity tracker 80, communication system 95, control system 117 and the HMD-to-sight alignment sub-system 300 remain operational. For example, in all modes of the ST system, the user biometrics determination and behavioral analysis module 527 may remain operation for training or non-training modes.

Figure 5B:
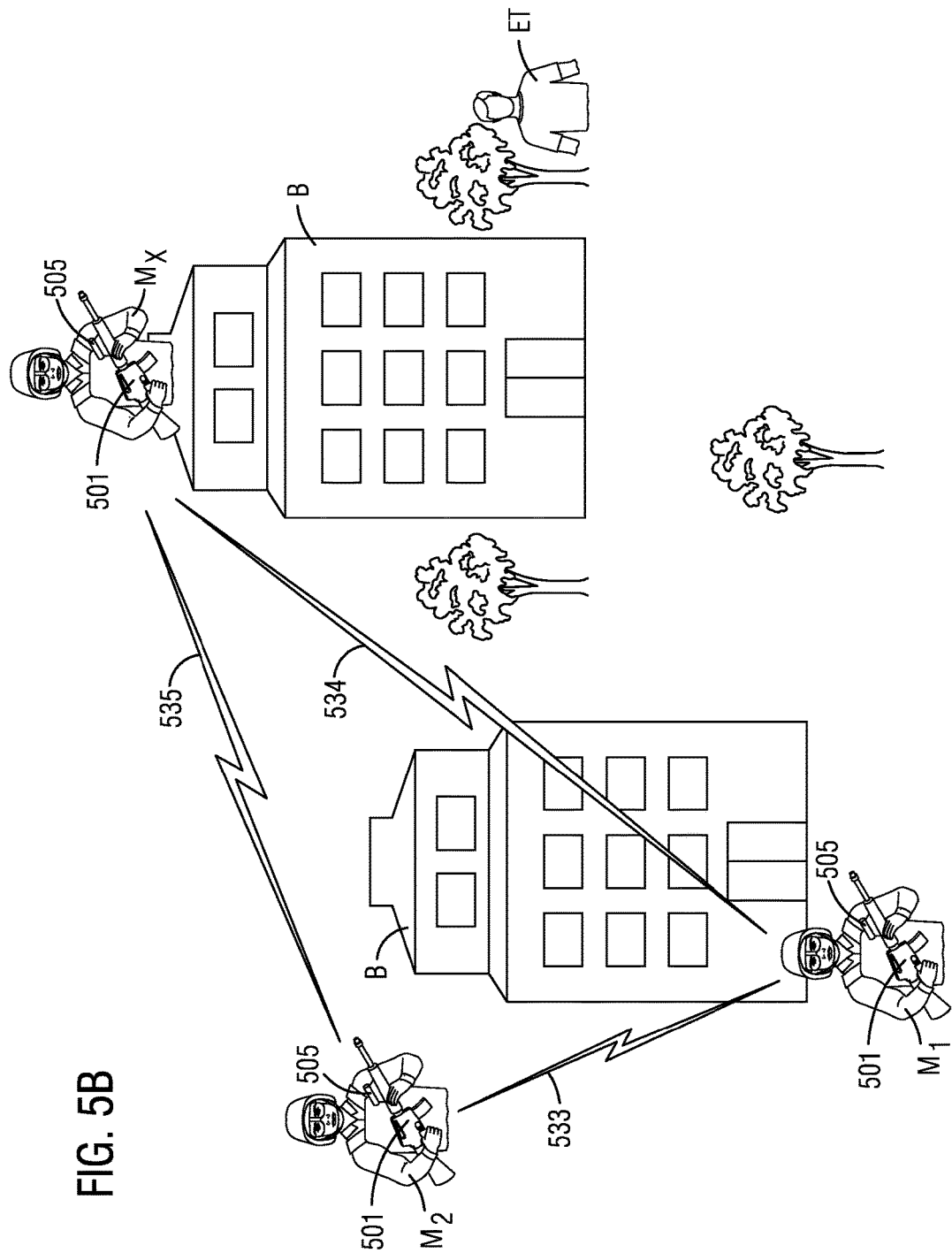
FIG. 5B illustrates a team or squad with at least one entity in an environment whether in the field or during training.

FIG. 5B illustrates a team or squad in an environment. The team or squad includes one or more members $M_1$, $M_2$, ..., $M_X$. Each of the members $M_1$, $M_2$, ..., $M_X$ may include a device 501 with a sight 505. Each of the members may wear an HMD apparatus, each of which may be configured to communicate with each other via wireless communication resources 533, 534 and 535. The HMD apparatus may also communicate (wired or wireless) with other communications devices in proximity to the HMD apparatus.

By way of non-limiting example, the environment includes buildings B or other obstructions including trees. The situation awareness may include determining the location of members $M_1$, $M_2$, ..., $M_X$ in the environment such as, without limitation, including whether a member is in a building. As illustrated by way of a non-limiting example, an entity ET behind a tree may be located, for example, by member $M_X$ or the HMD apparatus associated with the member such as by using computer vision.

Figure 7:
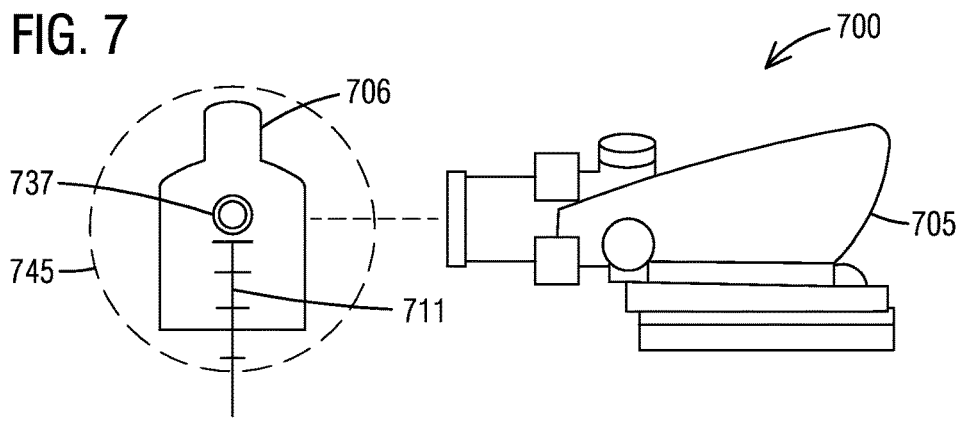
FIG. 7 illustrates a diagram for an optical sight's reticle display.

FIG. 7 illustrates diagram 700 for an optical sight's reticle display. The diagram 700 illustrates a sight dot 737 of a sight 705 and a target 706 within a sight field of view (S-FOV) 745 for conducting training. The reticle 711 of the sight 705 is also viewable in the sight field of view (S-FOV) 745. The reticle 711 in the sight field of view (S-FOV) 745 may be inherent to the sight field of view (S-FOV) 745. In FIG. 7, a silhouette of the target 706 is also seen. The silhouette is moved into the sight field of view (S-FOV) 745 through the natural actions of a user to move a sight to view the target 706 in the sight field of view (S-FOV) 745 so that the sight dot 737 is at an intended aim point location.

In a live training mode, the silhouette of the target 706 may actually exist in the distance in the real-world view. This is an example of a live training target. However, in a synthetic training mode, the silhouette may be displayed as CGD or an augmented reality image on the lens of the HMD apparatus 20. In some embodiments, some or all of the reticle 711 may be CGD or enhanced with highlighting as the target 706 becomes in range as will be discussed in more detail below.

Figure 8A:
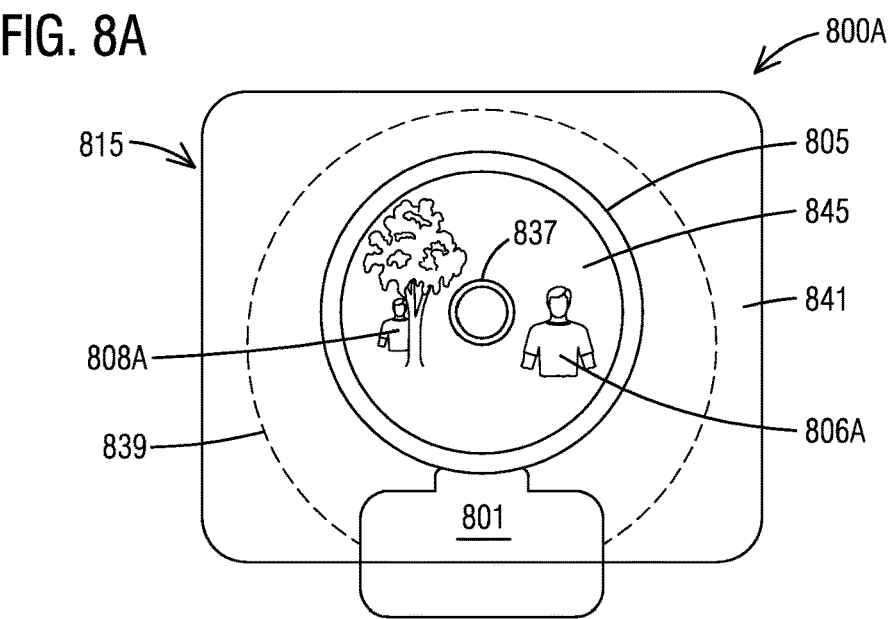
FIG. 8A illustrates an operational environment view through a lens of an HMD apparatus and sight field of view (S-FOV) of a sight.

FIG. 8A illustrates an operational environment view 800A through a lens 815 of an HMD apparatus and the sight field of view (S-FOV) 845 of a sight 805 mounted to a device 801 or weapon. The lens 815 has a real-world view through the HMD field of view (H-FOV) 841. In FIG. 8A, assume all elements are within the real-world view including the sight 805, sight body and the sight field of view (S-FOV) 845. The real-world view has an apparent size for all elements relative to its distance from the user consistent with the real-world view of the lens. In some embodiments, the lens 815 may be a prescription for a wearer's eyes. Therefore, the lens 815 may be configured such that the real-world view through the lens 815 is corrected for a user's eye glass prescription for astigmatism, near-sightedness and/or far-sightedness. The lens 815, which may have vision correction capabilities, has no magnification. In some embodiments, the lens 815 may be configured with no vision correction or magnification factors. In all configurations, the real-world view through the lens 815 has a first apparent size of the viewed scene and objects relative to its distance from the user and the sight field of view (S-FOV) 845 has a second apparent size relative to its distance from the user and relative to the magnification level of the real-world view while looking through sight 805.

The sight field of view (S-FOV) 845 may have a magnification level relative to the sight's magnification factor. The first aspect size and the second aspect size may be different sizes. The sight field of view (S-FOV) includes a sight dot 837.

In FIG. 8A, assume the sight 805 has been detected to be in range of the lens 815. As a result, the ST system 100 (FIG. 1) determines the sight parameters from the sight profile (FIG. 3A) and deploys the synthetic targeting field of view (ST-FOV) 839 to envelop the sight field of view (S-FOV). The device 1 (FIG. 1) or weapon 801 can also be seen through a portion of the synthetic targeting field of view (ST-FOV) 839 and HMD field of view (H-FOV) 841. The sight field of view (S-FOV) 845 and sight dot 837 of the sight 805 are viewed through the lens 815 as part of the real-world view. The objects in the real-world view of the sight field of view (S-FOV) 805 are at a second magnification corresponding to the sight's magnification factor. The synthetic targeting field of view (ST-FOV) 839 is represented by a dashed circle or part of a circle. The circle is representative of a boundary or displayed indicator of the synthetic targeting field of view (ST-FOV) 839 relative to the sight field of view (S-FOV) 845 and the HMD field of view (H-FOV) 841.

The sight field of view (S-FOV) 845 in FIG. 8A includes a tree, a visible target 806A, the sight dot 837 and another entity or obscured target 808A, behind the tree, being partially obstructed from view.

Assume now that the view 800A of FIG. 8A is for a training mode wherein the target 806A and obscured target 808A may be in the real-world view such as when targeting during live training. In a synthetic training mode, the visible target 806A may be computer generated data (CGD) wherein the visible target 806A is overlaid in the sight field of view (S-FOV) 845 relative to the magnification of the sight 805. The tree and obscured target 808A may also be overlaid in the sight field of view (S-FOV) 845 using the display device of the HMD apparatus.

Figure 8B:
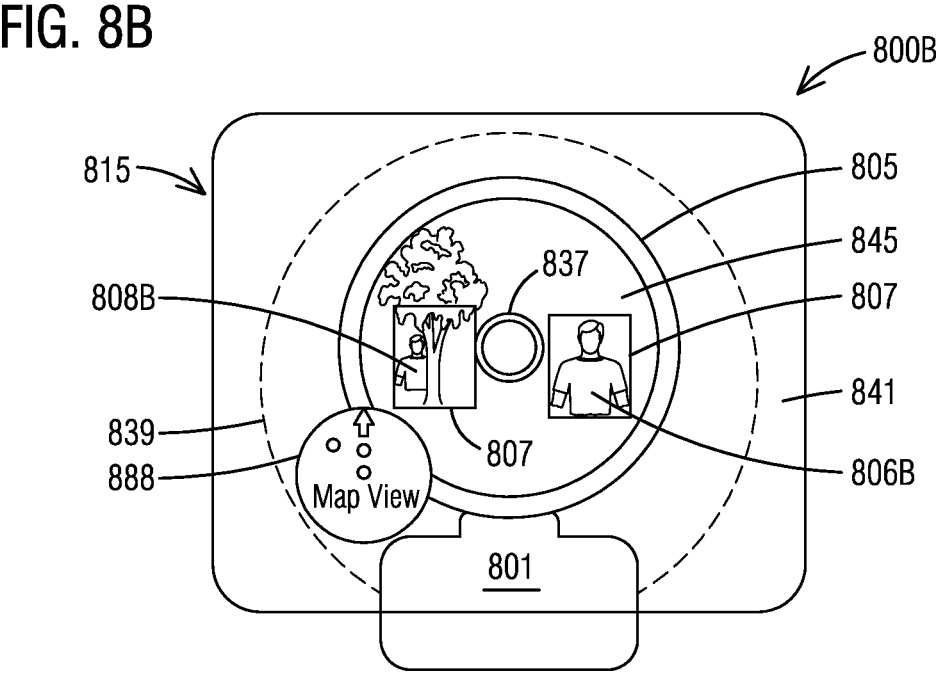
FIG. 8B illustrates an operational environment view through the lens 115 of an HMD apparatus with augmented reality images overlaid in the sight field of view (S-FOV) at the magnification factor of the sight and other computer-generated data in the synthetic targeting field of view (ST-FOV)

Referring also to FIG. 8B, an operational environment view 800B through the lens 815 of an HMD apparatus is illustrated with augmented reality images overlaid in the sight field of view (S-FOV) 845 at the magnification factor of the sight 805 and also shows other computer-generated data in the synthetic targeting field of view (ST-FOV) 839. The sight field of view (S-FOV) 839 includes a tree, a visible target 806B, the sight dot 837 and another entity or obscured target 808B behind the tree being obstructed from view. The synthetic targeting field of view (ST-FOV) 839 is a field of view which surrounds the perimeter of the sight field of view (S-FOV) 845 and provides a display ring field between the sight field of view (S-FOV) 845 and the indicator or boundary of the synthetic targeting field of view (ST-FOV) 839. The display ring field may be used to display CGD 888 such as the map view between the outermost boundary of the sight body of sight 805 and displayed indicator of the synthetic targeting field of view (ST-FOV) 839.

The ST system 100 (FIG. 1) may determine where the visible target 806B is within the sight field of view (S-FOV) 845 and may highlight the visible target 806B with a highlighting field 807. The highlighting field 807 is displayed by the display device of the HMD apparatus to bring attention to the visible target 806B in the sight field of view (S-FOV) 845.

By way of non-limiting example, the visible target 806B and tree may be determined by sensors or camera's associated with the HMD apparatus capturing the real-world view, as will be discussed in further detail in relation to FIG. 17.

The ST system 100 (FIG. 1) may determine where the obscured target 808B is within the sight field of view (S-FOV) 845 and may highlight an object obscuring the obscured target 808B with a highlighting field 807. The highlighting field 807 is displayed by the display device of the HMD apparatus to bring attention to the obscured target 808B in the sight field of view (S-FOV) 845. By way of non-limiting example, the obscured target 808B may be identified by external information received from team or squad members or other external sensors including unmanned aerial vehicle (UAV) video information or target coordinates.

The ST system 100 (FIG. 1) may determine other situational awareness information and provide such information within the synthetic targeting field of view (ST-FOV) 839. In this example, computer generated data (CGD) 888, representative of a map view, is displayed. The CGD 888 may overlap a portion of the sight field of view (S-FOV) 845, but should not obscure targets and the sight dot 837. The map view may include information or data from other user's synthetic targeting systems such as, without limitation, perspective views for situational awareness.

Assume now that the view 800B of FIG. 8B is for a live training mode wherein the target 806B may be in the real-world view such as when targeting during live training with weapon 801. In the live training mode, the target 806B may be highlighted by determining the location of the target 806B and magnification of the sight 805. The CGD 888 may also be provided in the live training mode. In the live training mode, the obscured target 808B may be highlighted. The obscured target 808B may be determined based on information from team or squad members that are taking part in the live training or by other external communication devices providing situational awareness information.

In a synthetic training mode, the visible target 806B may be computer generated data (CGD) wherein the visible target 806A is overlaid in the sight field of view (S-FOV) 845 relative to the magnification of the sight 805. The tree and obscured target 808A may also be overlaid in the sight field of view (S-FOV) 845 using the display device of the HMD apparatus.

Figure 8C:
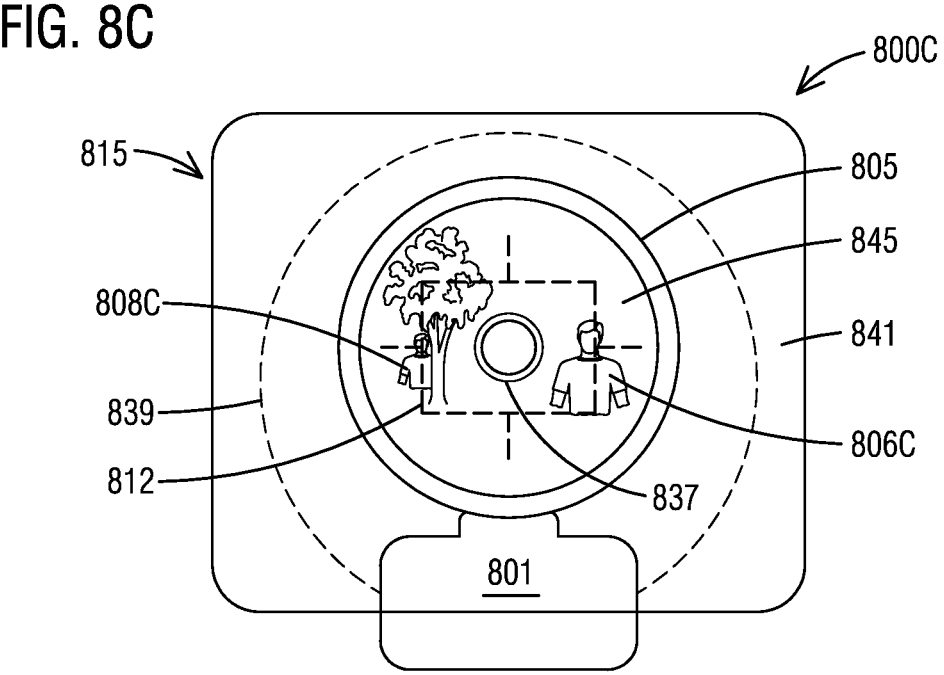
FIG. 8C illustrates a training environment view through the lens of an HMD apparatus and the S-FOV with virtual targets overlaid in the S-FOV at the magnification of the sight.

Referring also to FIG. 8C, a training environment view 800C through the lens 815 of an HMD apparatus is illustrated and the sight field of view (S-FOV) 845 with virtual targets overlaid in the sight field of view (S-FOV) 845 at the second magnification level relative to the magnification factor of the sight 805. The ST system 100 (FIG. 1) may determine where the AR target 806C is within the sight field of view (S-FOV) 845. An obscured target 808C is behind a tree. The ST system determines an eye gaze region of interest (EG-ROI) frame 812 based on the eye gaze direction detected. The EG-ROI frame 812 may be generated by a display device in the HMD apparatus that may be reflected by the beam splitter to the user's eyes while allowing light from the terrain and sight to pass through glass or a lens of the viewing area (i.e., lenses 815) to the eyes of the user.

The size of EG-ROI frame 812 may provide a boundary in the sight field of view (S-FOV) around the sight markers or dots marking a spot on a distant target object.

The EG-ROI frame 812 may be linked directly to the direction that the eyes are looking. The concept of "gaze" direction is that the eyes assume a gaze direction toward an object in the outside or real world. The EG-ROI frame 812 is sized so that the sight marker, aim point, sight target output or reticle is not occluded. The sight marker may be a colored sight dot. The CGD, when displayed, should have sufficient separation from the color sight dot 837 that may mark a spot on an object of interest or target.

The sight field of view (S-FOV) 845 and sight dot 837 may be part of the real-world view seen through the HMD field of view (H-FOV) 841. The EG-ROI frame 812 may be representative of the eye gaze envelope relative to the aim point when aligned. The sight field of view (S-FOV) 845, sight dot 837 and eye gaze region of interest (EG-ROI) frame 812 is viewed in the viewing area or HMD field of view (H-FOV) 841 of the HMD lens 815. The sight dot 837 may be moved to correspond to an aim point location in the view of terrain 225 (FIG. 2). In various embodiments, the sight field of view (S-FOV) 845, sight dot 837 and EG-ROI frame 812 may be placed in one viewing area (monocular view). The HMD apparatus 20 (FIG. 1) may be configured to control in which viewing area(s) the EG-ROI frame 812 appears. This occurs automatically, based upon which eye is judged to be looking through the scope, based upon the forward-facing sensor information.

In an augmented reality HMD apparatus 20, the viewing area may include a beam splitter. The sight field of view (S-FOV) 845 and sight dot 837 of the sight are viewed through the lens as part of the real-world view.

This weapon and HMD orientation data, as well as data regarding the sight field of view data and sight orientation, is processed via a processor or other circuitry. Then, the EG-ROI frame 812 relative to the sight field of view (S-FOV) 845 and sight dot 837 of the sight 805 in the real-world view through the HMD field of view (H-FOV) 841 for the current orientation of the weapon and HMD apparatus is displayed at the appropriate location in the HMD's current viewing area as augmented reality imagery.

The determined EG-ROI frame 812 may be used, as appropriate, to display alerts or messages directly in the frame 812. In certain modes, the determined EG-ROI frame 812 may be used, as appropriate, to display augmented reality (AR) images of a training exercise. The augmented reality (AR) images in the sight field of view (S-FOV) are intended to be displayed relative to the apparent size relative to its distance in the real-world view. Additionally, the apparent size relative to its distance may be based on a magnification factor of the sight and a zoom ratio or factor.

The system 100 generates the EG-ROI frame 812 to correspond to a visual field of the user, sized to surround a perimeter of the sight dot 837 or sight marker when the eye gaze direction of the user is essentially aligned with the sight dot 837 or sight marker, as best seen in FIG. 8C. The EG-ROI frame 812 is represented as a frame or window overlaid in the sight field of view (S-FOV) 845 and may move with the user's eye gaze direction. When the eye gaze direction moves, the EG-ROI frame 812 may move in some modes of operation. By way of non-limiting example, if an EG-ROI frame 812 is in a mode to move, the user may use their eyes to gaze at an object or target and obtain additional situational awareness information either in the sight field of view (S-FOV) 845 or the synthetic targeting field of view (ST-FOV) 839. The use of the EG-ROI frame 812 may be user selected. For example, the EG-ROI frame 812 may be converted to a region selector similar to a mouse by using an eye blinking pattern to select an area the user's gaze is directed. Additional information may be obtained for the selected region. By way of example, the selected region can be uploaded for selective situational awareness to be shared remotely or with others in the team or squad based on the user's sight field of view (S-FOV) 845 wherein the object's location in the sight field of view (S-FOV) 845 is determined based on the sights magnification factor.

The motion of the EG-ROI frame 812 may be smoothed by a moving average of the eye locations. If the location on the HMD field of view (H-FOV) 841 is defined by a point P, having vertical component Py and horizontal component Px, for a moving average of N points, or N−1 time periods into the past, the location of the center of the EG-ROI frame 812 is:

$$Pc = \frac{\sum_{n=0}^{n=-(N-1)} P(n)}{N}; N \geq 1$$

where
P(0)=the eye point now;
P(n)=the eye point n time periods from now, will be negative for time in the past; and
Pc=the current EG-ROI frame center now.
The sum of two points is:

$P(0)+P(-1)=[Px(0)+Px(-1),Py(0)+Py(-1)]$.

For larger values of N there is more smoothing. If N=1, there is no smoothing; for N=10, there are 10 eyepoints averaged together, so if the eye performs saccades or other natural erratic motion, the EG-ROI frame will not jitter around as much as the eye does. When the tracked eye gaze direction of the user is essentially aligned with the sight dot 837 or sight marker viewed in the real world, the EG-ROI frame 812 surrounds the sight marker or sight dot 837.

In some embodiments, the ST system 100 may generate an EG-ROI frame alignment zone on the HMD lens 815 in the synthetic targeting field of view (ST-FOV) 839 corresponding to the user gaze direction to sight marker alignment. The EG-ROI frame 812 defines a visual field or region of interest in the real-world view, in some embodiments or applications. However, the EG-ROI frame 812 can move in the synthetic targeting field of view (ST-FOV) 839 as the tracked eye gaze direction changes.

FIG. 8C illustrates the overlaying of the eye gaze region of interest (EG-ROI) frame 812 in the sight field of view (S-FOV) 845 surrounding and aligned with the sight dot 837. The sight field of view (S-FOV) 845 is the field of view seen through a lens of the sight 805 on weapon 801. The sight may include a reticle which may be overlaid in the sight field of view (S-FOV) as will be described in more detail in FIGS. 9A-9C. The EG-ROI frame 812 may include a box or crosshair element providing an eye gaze envelope which can be aligned with the sight dot 837 on the viewing area (i.e., lenses 815) with the real-world view seen through the sight field of view overlaid on the HMD lens 815. In other words, in this illustration, the EG-ROI frame 812 is aligned with the sight dot 837 because the user's gaze is in the direction of and aligned with the sight dot 837. However, the EG-ROI frame 812 may be based on the gaze direction of the user and independent of the sight dot 837. The user can move their eyes to move the EG-ROI frame 812 to align with the sight dot 837 such as when viewing an object through the sight 805.

Figure 9A:
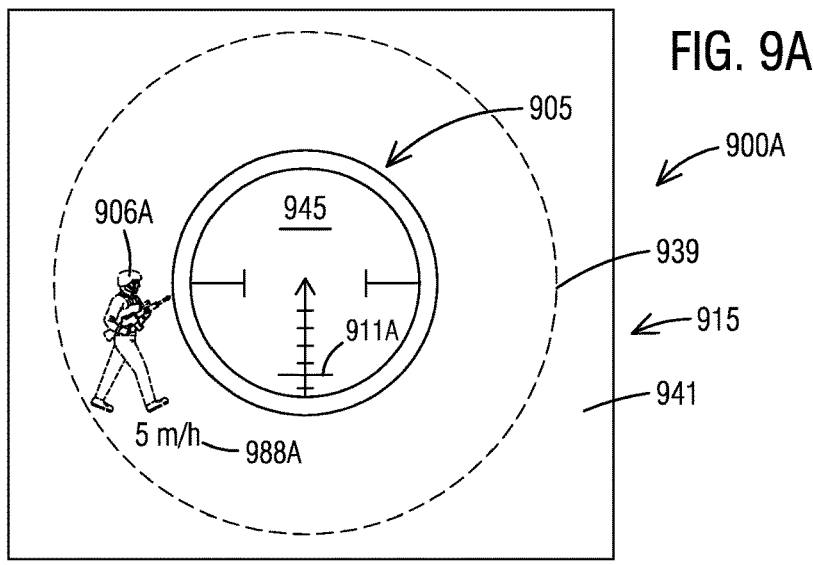
FIG. 9A illustrates a diagram representative of situational awareness information being displayed as an augmented reality (AR) image superimposed in the synthetic targeting field of view (ST-FOV) according to a mode of operation.

FIG. 9A illustrates a diagram 900A representative of situational awareness information being displayed as an augmented reality (AR) image superimposed in the synthetic targeting field of view (ST-FOV) 939 according to a mode of operation. Assume for this illustration that in one mode, the user is part of a team. Information received by the HMD apparatus locates target 906A. The target 906A is displayed in the synthetic targeting field of view (ST-FOV) 939 with additional CGD 988A below the target. In this example, the ST system 100 (FIG. 1) determines that the target 906A is moving in a certain direction at a speed for example of 5 miles per hour. The rate of movement is for illustrative purpose only. The AR image of the target 906A and the CGD 988A are both displayed in the synthetic targeting field of view (ST-FOV) 939, for example, on the HMD lens 915. By way of non-limiting example, if the user is looking through the sight 905 for targets, the AR image of the target 906A and the CGD 988A are in proximity to the sight field of view (S-FOV) 945 for a quick glance by the user for additional situational awareness. The sight field of view (S-FOV) 945 includes a reticle 911A which can be used by the user to align the sight 905 with a target.

Figure 9B:
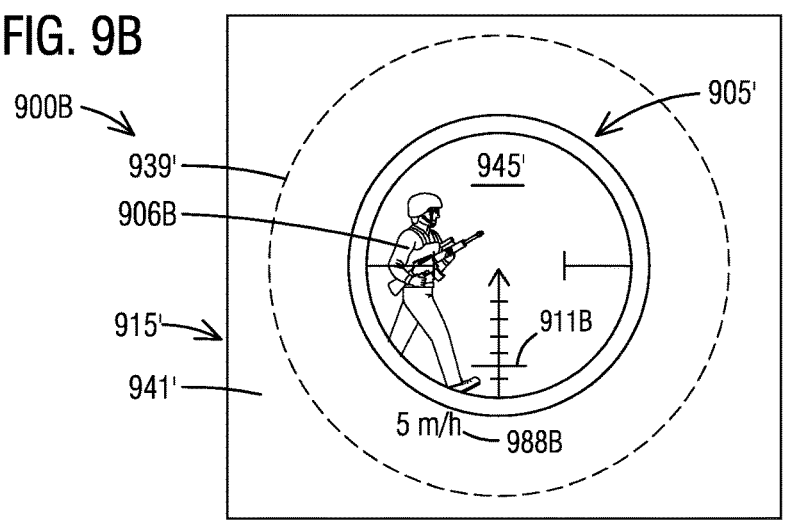
FIGS. 9B-9C illustrate diagrams representative of movement of a target in the sight field of view (S-FOV)
Figure 9C:
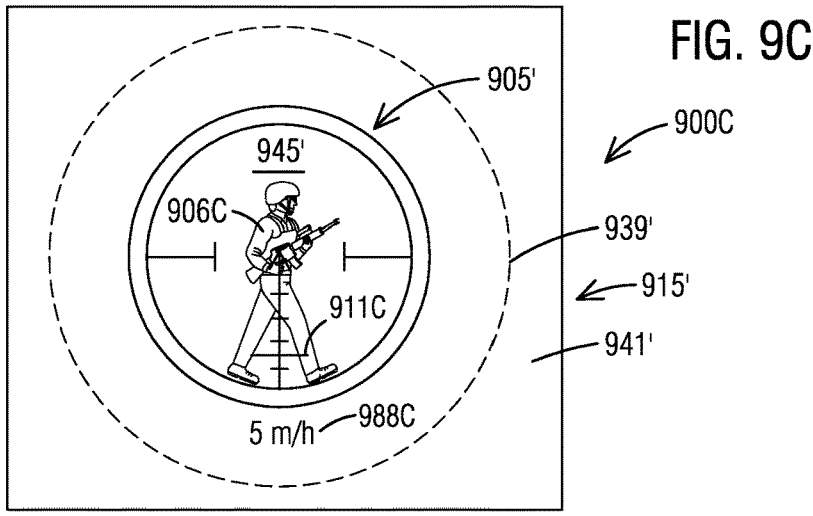

FIGS. 9B and 9C illustrate diagrams 900B and 900C representative of movement of a target in the sight field of view (S-FOV) 945'. In FIG. 9B, assume the target 906B is in the real-world view of the sight 905' associated with a different user. The target 906B is not yet aligned with the reticle 911B of the sight field of view (S-FOV) 945'. The user can move the sight 905' according to standard practices of targeting to move a moving target 906B to be aligned with the reticle (i.e., reticle 911C of FIG. 9C). In FIG. 9C, the target 906C is aligned with the reticle 911C. The sight field of view (S-FOV) 945' and target 906B or 906C are natural at the apparent size relative to its distance in the real-world view and adjusted based on the magnification factor of the sight 905'. In some embodiments, the apparent size relative to its distance in the real-world view may be adjusted bases on a zoom ratio or zoom factor.

The ST system 100 (FIG. 1) can display CGD 988B and CGD 988C. The CGD 988A, 988B and 988C are all the same data and display within the synthetic targeting field of view (ST-FOV) 939 or 939' for additional situational awareness information. However, the placement of the CGD 988A will vary based on movement of the target 906A relative to the synthetic targeting field of view (ST-FOV) 939. The CGD 988B is also displayed in the synthetic targeting field of view (ST-FOV) 939', but is positioned as close as possible to the target 906B of the real-world view through the HMD lens 915'. Likewise, the CGD 988C is also displayed in the synthetic targeting field of view (ST-FOV) 939', but is positioned as close as possible to the target 906C of the real-world view and is moved relative to the new location of target 906C.

By way of non-limiting example, the synthetic targeting field of view (ST-FOV) surrounds the sight 905' and sight field of view (S-FOV) 945' to provide a constrained display field where targeting information or situational awareness can be displayed within a near-eye-gaze glance by the user's eye away from the sight field of view (S-FOV) when targeting a target.

In the above description of FIGS. 9A-9C, the squad or team member viewing sight 905 of FIG. 9A may be a different member from the member viewing the sight 905' of FIGS. 9B and 9C such as in an operational (live) environment.

Assume now that the FIGS. 9A-9C are for the same squad or team member during an operational (live) environment. By way of example, target 906A may be situational awareness information of an approaching target moving in the direction of the user. The diagrams of FIGS. 9B and 9C are representative of the target 906B or 906C once the user has captured the target in the real-world view while looking down the sight 905'. For example, the target 906B or 906C may become within the real-world view while looking down the sight 905' by changing the direction of the sight 905' and/or moving their head and eye gaze.

Assume now that the FIGS. 9A-9C are for the same team squad member during a training mode. By way of example, target 906A (FIG. 9A) may be a training entity in the form of an AR image displayed at the apparent size relative to its predetermined distance from the user within a real-world view through the HMD lens 915 (FIG. 9A). During various training exercises, the predetermined distance may be varied from one learning task to another.

The ST system 100 (FIG. 1) may generate CGD 988A to denote in some instances a rate of movement. Other information may be displayed including, but not limited to, weapon type and target type, such a friend or foe. The ST system 100 (FIG. 1) may determine that the person in the real-world view may be a friend. The target may be a foe in a group of friends, in some exercises.

While an approaching target 906A moves in the direction of the user, the apparent size of the displayed target 906A may change relative to its distance from the user in the real-world view (while the target 906A is outside of the sight field of view (S-FOV) 945). The diagrams 900B and 900C of FIGS. 9B and 9C are representative of the target 906B or 906C once the user has captured the target in the real-world view while looking down the sight 905'. Thus, the target 906B or 906C will have a second apparent view relative to its distance from the user and as a function of the magnification consistent with the magnification corresponding to the magnification factor of the sight 905'.

For example, the target 906B or 906C may become within the real-world view while looking down the sight 905' by changing the direction of the sight 905' and/or moving their head in the direction of the target.

The training system 30 (FIG. 5A) may track and record the performance of the user's training exercise. The results may be displayed in the HMD field of view (H-FOV) 941 (FIG. 9A) to the user using the HMD apparatus 20 (FIG. 5A).

The blocks of the methods and processes shown herein may be performed in the order shown or a different order. Some blocks may be performed contemporaneously. One or more blocks may be added or omitted.

Figure 10A:
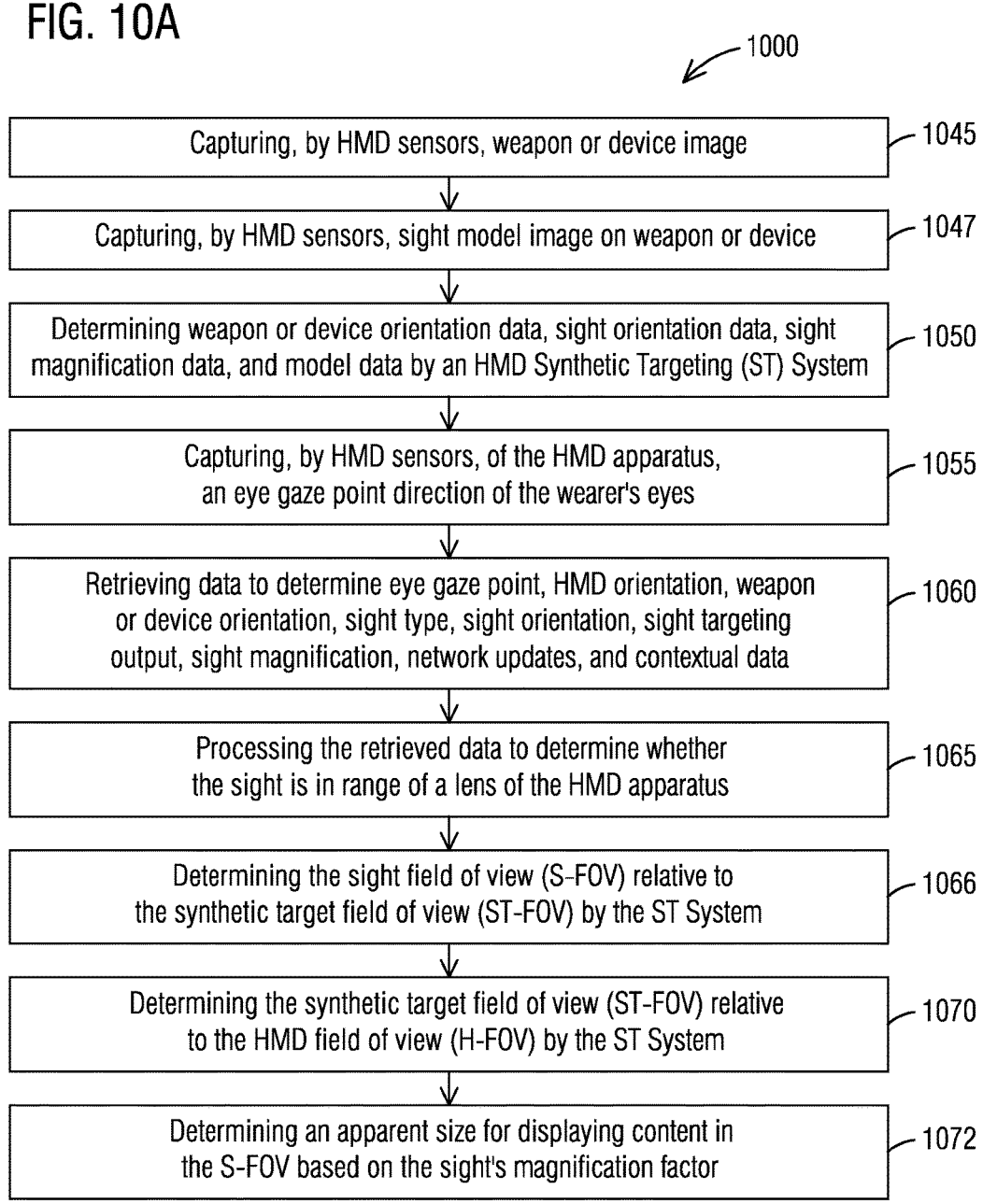
FIGS. 10A-10B are a block flowchart illustrating a method of performing synthetic targeting with a head mounted display (HMD) apparatus using a sight of a device according to an embodiment.
Figure 10B:
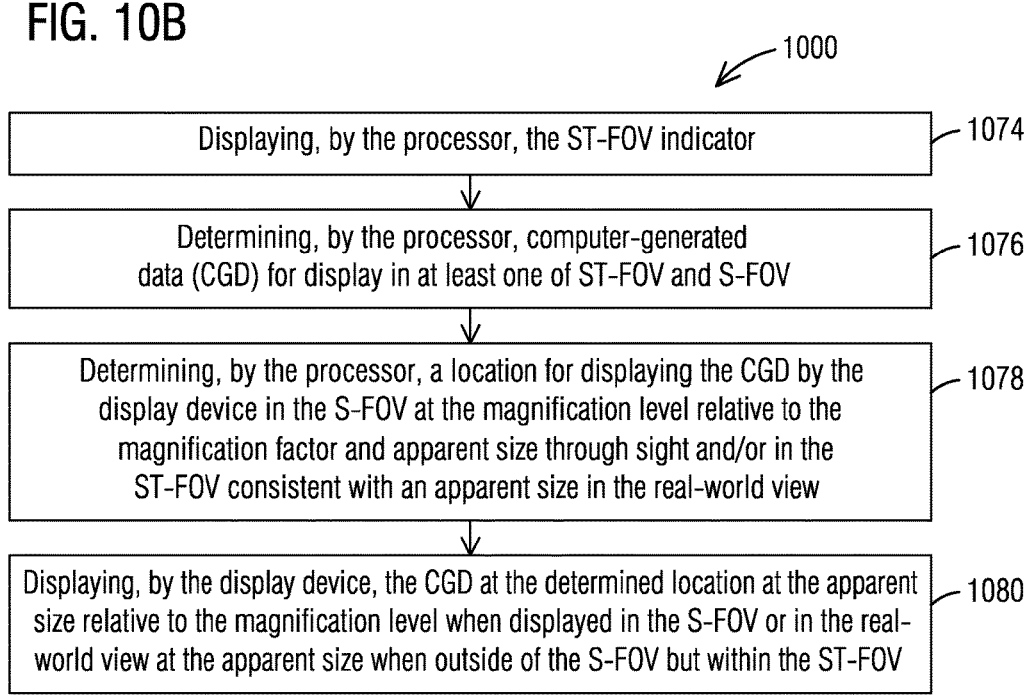

FIGS. 10A and 10B are block flowcharts illustrating a method 1000 of performing synthetic targeting with a head mounted display (HMD) apparatus (i.e., HMD apparatus 20) using a sight of a device according to an embodiment. The method 1000 may include, at block 1045, capturing the weapon or device image and, at block 1047, capturing the sight model image on the weapon or device. In general, the blocks 1045 and 1047 may be performed simultaneously.

At block 1047, the HMD apparatus (i.e., HMD apparatus 20) is configured to capture or recognize the sight on the device or weapon to which it is mounted when in close proximity to the HMD lens. The plurality of forward-facing sensors 130 are configured to capture the sight in the real-world view. Thus, at least one of the weapon/device and sight are configured to be captured in real-time.

At block 1050, the method 1000 includes determining the device (i.e., weapon) and/or orientation data based on the captured device (i.e., weapon) image(s). The sight orientation data, sight model data, sight magnification data are determined by the ST system 100 (FIG. 1) associated with the HMD apparatus based on the captured sight image(s). The device (i.e., weapon) orientation data may be calculated by the HMD apparatus' processor, a separate processor or ST system 100. Likewise, the ST system 100 is configured to calculate the sight orientation data. In one or more modes of operation, the method 1000 may include, at block 1055, capturing by HMD sensors 120 an eye gaze point direction of the wearer's eyes. The eye tracking sensors 120 (FIG. 4A) may be used to capture and track the eye gaze point direction.

At block 1060, the method 1000, may include retrieving data to determine one or more of eye gaze point, HMD orientation, weapon or device orientation, sight type, sight orientation, sight targeting output, sight magnification factor, network updates and contextual data. At block 1065, the method 1000 may include processing the retrieved data to determine whether the sight is in range of a lens 115 (FIGS. 4A-4D) of the HMD apparatus 20 (FIGS. 4A-4D). The captured information or data may be processed, at block 1065, to ensure that the computer-generated data (CGD) is in a form that can be displayed relative to the terrain being viewed via the HMD apparatus in the real-world view. The processor may process HMD orientation data to determine x, y and z positional coordinates as well as angular orientation coordinates (such as roll, pitch and yaw). In some embodiments, GPS coordinates or actual images may be provided. Specifically, the ST system 100 (FIG. 1) may calculate orientation data for the HMD apparatus to determine the orientation of the HMD apparatus with respect to the terrain and to correlate the terrain to the eye gaze and/or the HMD field of view (H-FOV) to display information at a first magnification relative to the HMD field of view (H-FOV). In operation, the processed data is stored and updated in real-time for CGD alignment in the fields of view, as described below.

At block 1065, the system 100 may retrieve the weapon orientation data and sight orientation data and model data for processing to recognize the sight, sight type, sight field of view, sight targeting output (i.e., sight reticle, crosshairs, sight dot, or sight mark). The ST system 100 (FIG. 1) may determine network updates and contextual data for operational use or training modes. For example, the system 100 may receive situation awareness information from external sources including other team or squad members.

At block 1066, method 1000 may include determining the sight field of view (S-FOV) relative to the synthetic target field of view (ST-FOV) by the ST system 100. The system 100 is configured to determine the sight field of view (S-FOV) according to the current HMD orientation and sight orientation of the in-range sight (i.e., in proximity to an HMD lens), including in some embodiments, the sight dot and/or reticle. The system 100 may also determine a gaze direction of the user to determine the eye gaze region of interest (EG-ROI) frame, as will be discussed in FIG. 11. The sight field of view (S-FOV) is in the real-world view of the lens 115 (FIG. 1 or FIG. 4A) of the HMD apparatus.

At block 1070, the method 1000 may include determining the synthetic target field of view (ST-FOV) relative to the HMD field of view (H-FOV) by the ST system 100. The ST system 100 processes the retrieved data to determine a synthetic target field of view (ST-FOV) relative to the HMD field of view (H-FOV). In other words, the displayed indicator of the synthetic target field of view (ST-FOV) is bound by the area of the HMD lens. The method 1000 may include, at block 1072, determining a magnification level of the sight field of view (S-FOV) based on the sight magnification factor. In some embodiments, a zoom factor may be determined.

In relation to FIG. 10B, the method 1000 may comprise, at block 1074, displaying, by the processor, the ST-FOV indicator denoted as a circle or a dashed circle displayed in the HMD field of view (H-FOV) around the sight and sight field of view (S-FOV). Other geometric shapes may be used. At block 1074, the system 100 may display on the lens of the HMD apparatus, an indicator indicative of a boundary of the synthetic target field of view (ST-FOV) around the sight field of view (S-FOV). The indicator may provide the user a frame of reference to which to glance within the synthetic target field of view (ST-FOV) for display of CGD, as described above in relation to FIGS. 8A-8C and 9A-9C. The CGD in the synthetic target field of view (ST-FOV) is displayed according to an apparent size of objects relative to their predetermined distance from the user in the real-world view corresponding to the lens of the HMD apparatus. The apparent size may vary based on the distance of the object represented in the CGD relative to the wearer of the HMD apparatus, as a result of depth perception of a real-world view by the user's eyes. The CGD may also include icons, text or alphanumeric characters which may be displayed at a designated location. If the text or alphanumeric characters is related to an object in the real-world view, such text or characters are displayed in proximity to the object.

The method 1000 may include, at block 1076, determining, by the processor, computer-generated data (CGD) for display in at least one of the synthetic field of view (ST- FOV) and the sight field of view (S-FOV); and, at block 1078, determining, by the processor, a location for displaying the CGD by the display device in the sight field of view (S-FOV) at the magnification level relative to the magnification factor and apparent size, and/or in the ST-FOV at an apparent size relative to the distance consistent with the real-world view. The method 1000 may include, at block 1080, displaying, by the display device, the CGD at the determined location and at an apparent size relative to the magnification level when displayed in the S-FOV or in the real-world view at the apparent size when outside of the S-FOV, but within the ST-FOV. Objects in the sight field of view (S-FOV) are subject to the apparent size in the real-world view according to the sight, but at a magnification factor associated with the sight.

Figure 11:
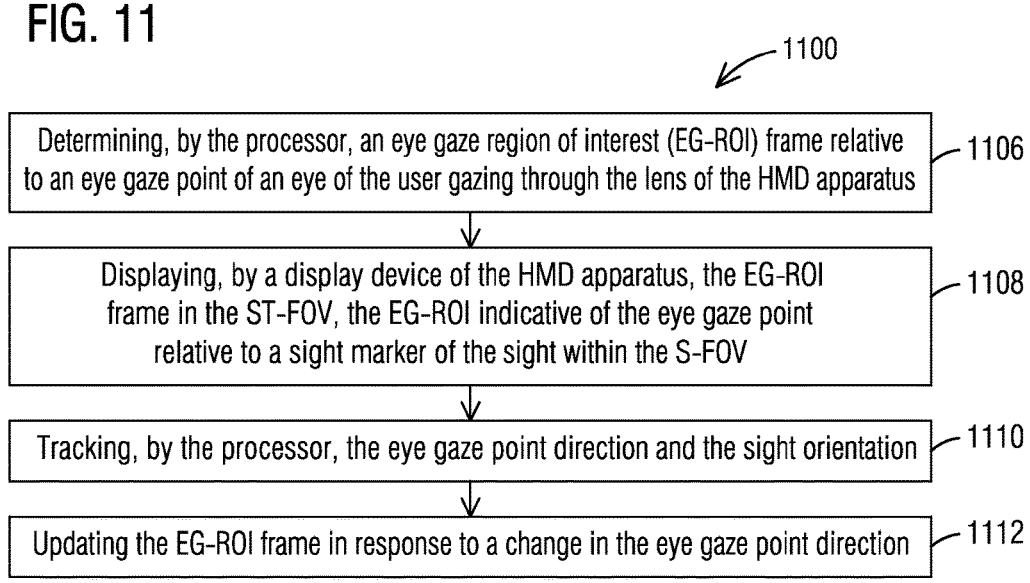
FIG. 11 illustrates a flowchart of a method for displaying computer generated data in synthetic targeting FOV (ST-FOV) which includes an eye gaze region of interest (EG-ROI) frame.

FIG. 11 illustrates a flowchart of a method 1100 for displaying computer generated data in synthetic targeting FOV (ST-FOV) which includes an eye gaze region of interest (EG-ROI) frame. The method 1100, at block 1106, may comprise determining, by the processor, an eye gaze region of interest (EG-ROI) frame relative to an eye gaze point of an eye of the user gazing through the lens of the HMD apparatus. The method 1100 may comprise, at block 1108, displaying, by a display device of the HMD apparatus, the EG-ROI frame in the sight field of view (S-FOV), the EG-ROI indicative of the eye gaze point relative to a sight marker of the sight within the S-FOV. The method 1100 may include tracking, by the processor, the eye gaze point direction and the sight orientation, at block 1110. The method 1100 may comprise, at block 1112, updating the EG-ROI frame in response to change in at least the eye gaze point direction. In some embodiments, the EG-ROI frame may move based on the eye gaze point direction outside of the sight field of view (S-FOV). The method of FIG. 11 may be performed as part of the method or process of FIGS. 10A-10B, 12, 13 and 18.

Figure 12:
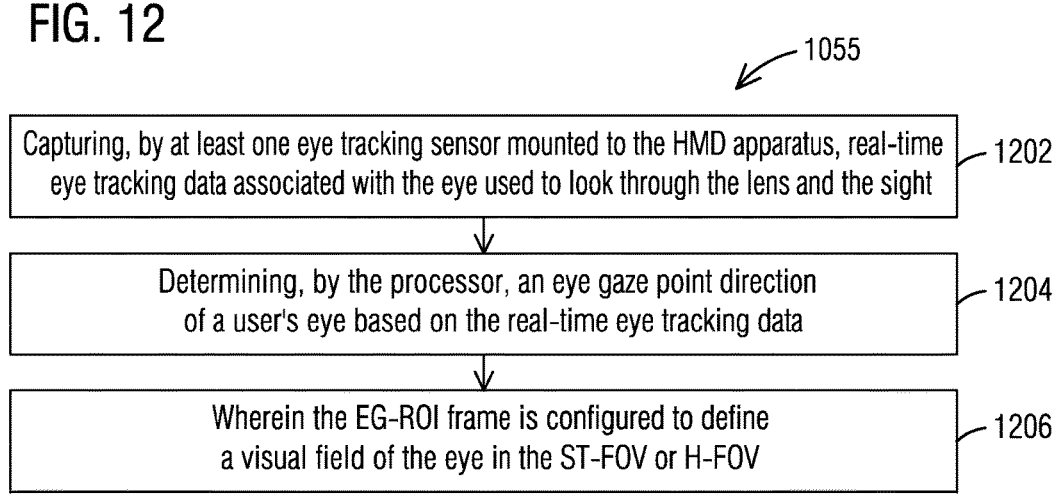
FIG. 12 illustrates a flowchart of a method for eye tracking.

FIG. 12 illustrates a flowchart of a method 1055 for eye tracking. The method 1055 may comprise, at block 1202, capturing, by at least one eye tracking sensor mounted to the HMD apparatus, real-time eye tracking data associated with the eye used to look through the lens and the sight. At block 1204, the method 1200 may comprise determining, by the processor, an eye gaze point direction of a user's eye based on the real-time eye tracking data. The EG-ROI frame may be configured to define a visual field of the eye in the synthetic targeting field of view (ST-FOV). The EG-ROI frame may define a visual field of the eye in the HMD field of view (H-FOV). The EG-ROI frame also displayed in the sight field of view (S-FOV).

The method 1055 in FIG. 12 may be performed when the HMD apparatus is used in a training mode or other modes. The method 1055 may further comprise determining whether the HMD apparatus is in a training mode or a non-training mode. When the HMD apparatus is in the training mode, it may display a training augmented reality (AR) image. When training, the method may comprise tracking the engagement of the user with the AR image using the weapon based on movement of the eye gaze relative to the EG-ROI frame being aligned with the sight mark, dot or reticle. When in the training mode, the method may further comprise capturing behavioral responses relative to engagement of the AR image using eye gaze or facial features during use of the weapon; and recording the behavioral responses, as will be described in relation to FIG. 13.

Figure 13:
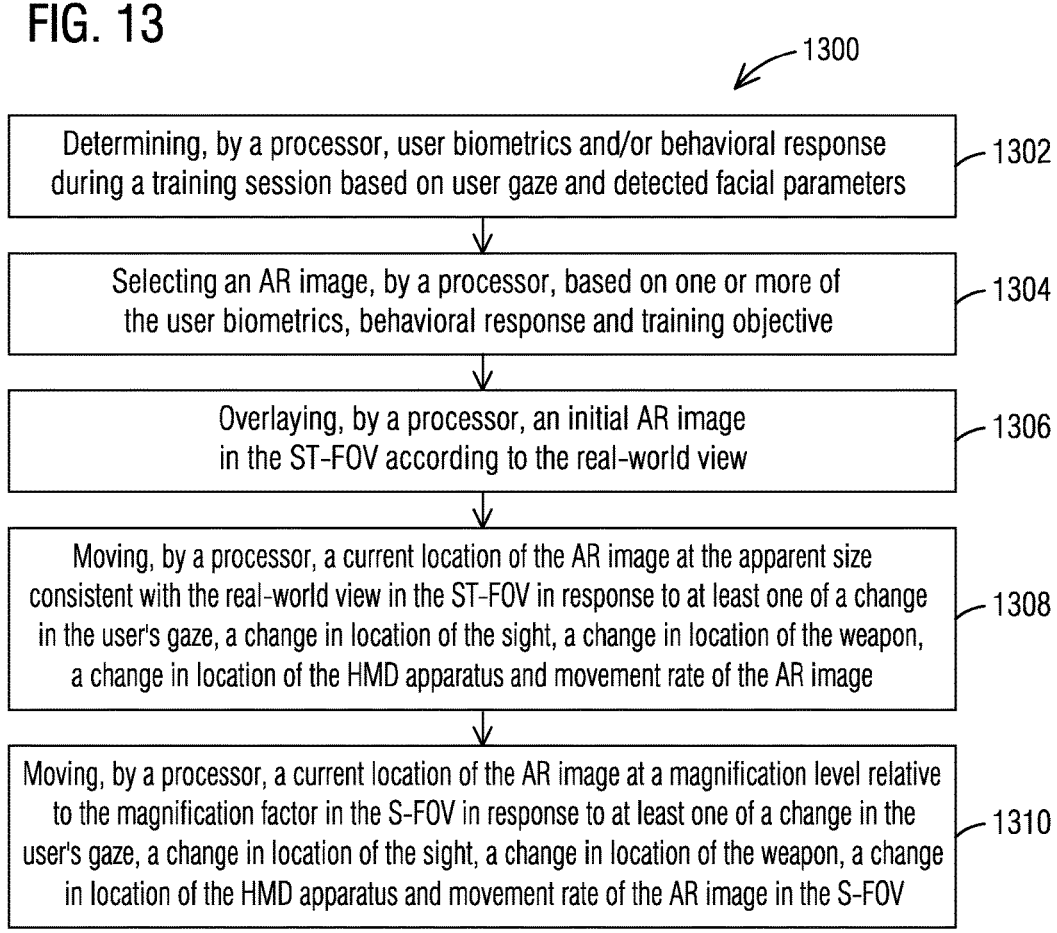
FIG. 13 illustrates a flowchart of a process for reticle-aligned synthetic targeting in a training mode.

FIG. 13 illustrates a flowchart of a process 1300 for reticle-aligned synthetic training. The process 1300 may include, at block 1302, determining, by a processor, user biometrics and/or behavioral or cognitive response during a training session based on user gaze, detected facial parameters and other biometrics relative to stress, eye twitching, by way of example. The cognitive response may include determining delays (hesitation) in target engagement with a weapon, for example, or other cognitive parameters that may need training to add or remove from a user's cognitive response to increase performance.

The process 1300 may include, at block 1304, selecting an AR image, by a processor, based on one or more of the user biometrics, behavioral response, cognitive response and training objectives. The process 1300 may include, at block 1306, overlaying, by a processor, the AR image in the H-FOV (or synthetic targeting field of view (ST-FOV)) aligned with the sight field of view (S-FOV) at the apparent size. The apparent size may be relative to the user's distance to an object in the real-world view. The process 1300 may include, at block 1308, moving, by a processor, a current location of the AR image at the apparent size consistent with the real-world view in the ST-FOV in response to at least one of a change in the user's gaze, a change in location of the sight, a change in location of the weapon or device, a change in location of the HMD apparatus and movement rate of the AR image. The term "moving" includes updating a display location of an image relative to the real-world view.

The process 1300 may include, at block 1310, moving, by a processor, a current location of the AR image at an apparent size in a real-world view and a magnification level relative to the magnification factor in the S-FOV in response to at least one of a change in the user's gaze, a change in location of the sight, a change in location of the weapon or device, a change in location of the HMD apparatus and movement rate of the AR image in the S-FOV. As can be appreciated by this disclosure, the sight body may partially obscure all or part of an AR image as the image moves from a real-world view outside of the sight into to the sight field of view (S-FOV) of the sight.

Figure 14A:
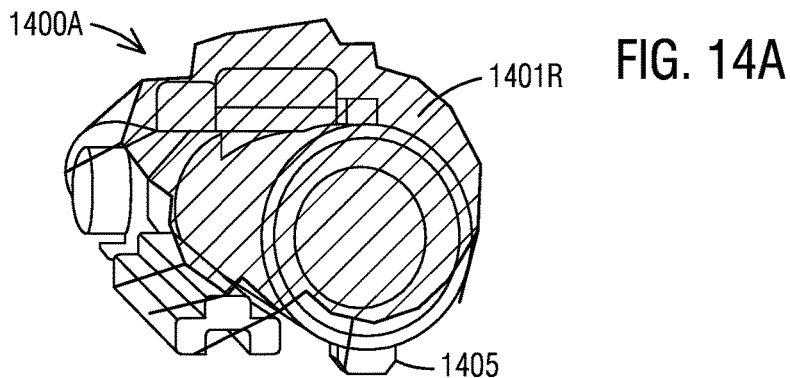
FIG. 14A illustrates a point cloud of a sight.

FIG. 14A illustrates a point cloud 1400A of a sight 1405 with depth sensory data and point cloud 1401R which would be stored in memory for use in determining the sight profile. In this illustration, point cloud 1401R is overlaid on the body of the sight 1405.

Figure 14B:
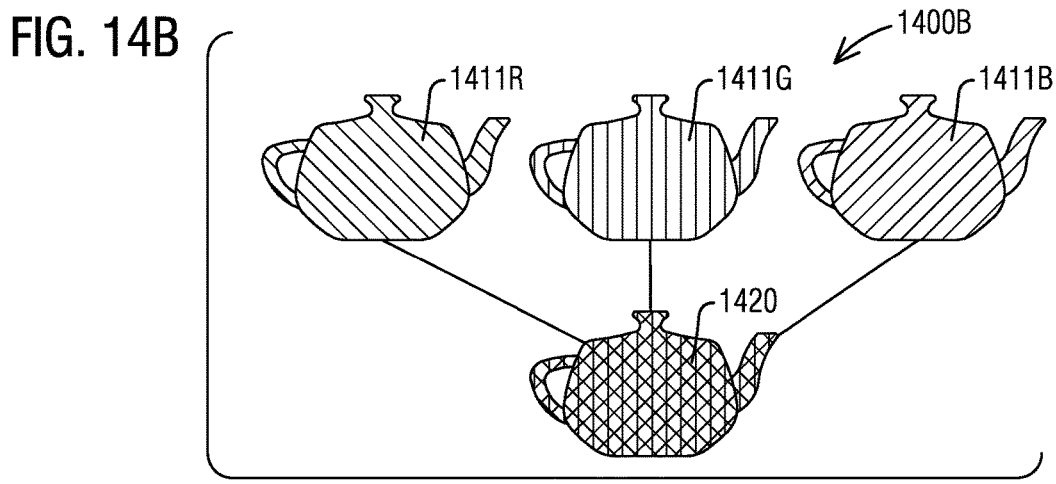
FIG. 14B illustrates blending of point clouds from multiple sensors.

FIG. 14B illustrates blending of RGB point clouds 1411R, 1411G and 1411B from RGB sensors into a composite three-dimensional (3D) model of the sensed object 1420. The object is a tea pot for illustrative purposes only. Each point cloud (i.e., red point cloud 1411R, green point cloud 1411G and blue point cloud 1411B) is merged into a three-dimensional (3D) model of the sensed object or sight. The matching of the sight may include iterative closest point to point cloud matching. The point-to-point matching may be used to query a library of sight meshes to the forward-facing depth camera data from the plurality of sensors 130 to determine the sight's 6-DOF orientation.

The sight's 6-DOF orientation detection and the identification of a user's optical sight (dynamical moving sight) and eye gaze as the center origin is used for placing augmented content (i.e., training elements and/or tactical data) on an HMD field of view aligned with the user's sight field of view.

The training system 30 (FIG. 5A) applies target assistance/HMD content based on human performance (gaze) first-order assessment and optionally second-order assessment (intent, engagement, stress, etc.) such as through behavioral or cognitive biometrics and analysis.

In reference again to FIG. 5B, FIGS. 8A-8C and FIGS. 9A-9C, the ST system 100 (FIG. 1) may use data from multiple users' optical sights for environment mapping perspectives and entity identification for enhanced situational awareness between users. The mapping of entities (augmented or real imaging) is selectively augmented depending on the intent of user(s) and/or the users' perspective, allowing augmented reality content to be effectively utilized during weapon or object targeting; and thus, increasing the users' training capability as well as their situational awareness in training and operational environments. In reference to FIG. 8B, the reference number 888 includes synthetic targeting data (optical targeting imagery/data) orientation transmitted/shared with multiple users for tactical and/or training use. The map view may include the location of multiple team or squad members in an area.

The engagement/disengagement with HMD content through optical sighting alignment is intended to allow for more informed decision-making and assessment in training or operational environments.

Figure 15:
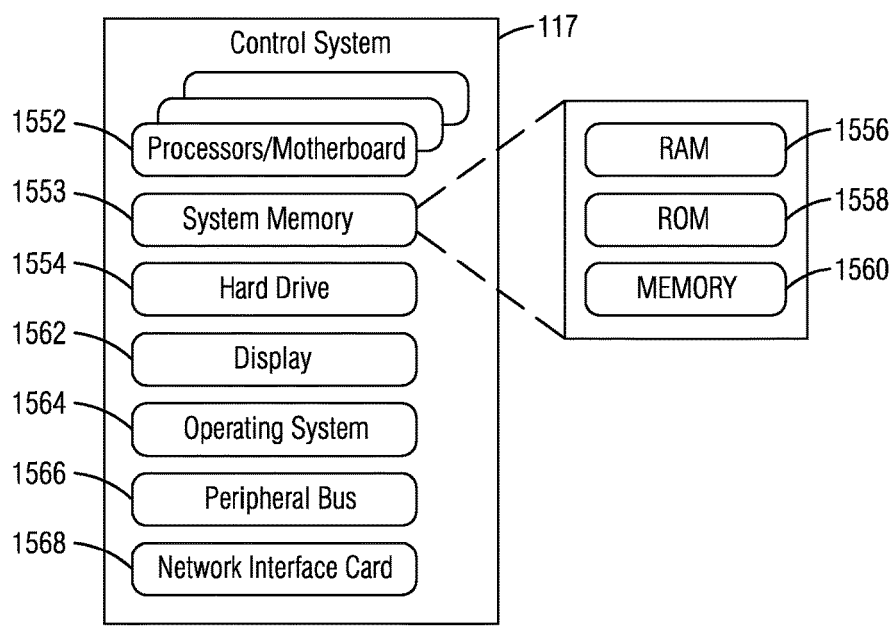
FIG. 15 illustrates a block diagram of a control system.

FIG. 15 illustrates a block diagram of the control system 117. The control system 117 may include one or more processors 1552 and system memory 1553 and hard drive 1554. Depending on the exact configuration, system memory 1553 may be volatile (such as RAM 1556), non-volatile (such as read only memory (ROM 1558), flash memory 1560, and the like) or some combination thereof. System memory may store operating system 1564, one or more applications, and may include program data for performing one or more operations, functions, methods and processes described herein.

Control system 117 may also have additional features or functionality. For example, control system 117 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data, and which can be accessed by control system. Any such computer storage media may be part of the device.

Control system 117 may also include or have interfaces for input device(s) (not shown) such as a keyboard, mouse, pen, voice input device, touch input device, etc. The control system 117 may include or have interfaces for connection to output device(s) such as a display 1562, speakers, etc. The control system 117 may include a peripheral bus 1566 for connecting to peripherals. Control system 117 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The control system 117 may include a network interface card 1568 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, and a digital versatile disc (DVD).

Figure 16A:
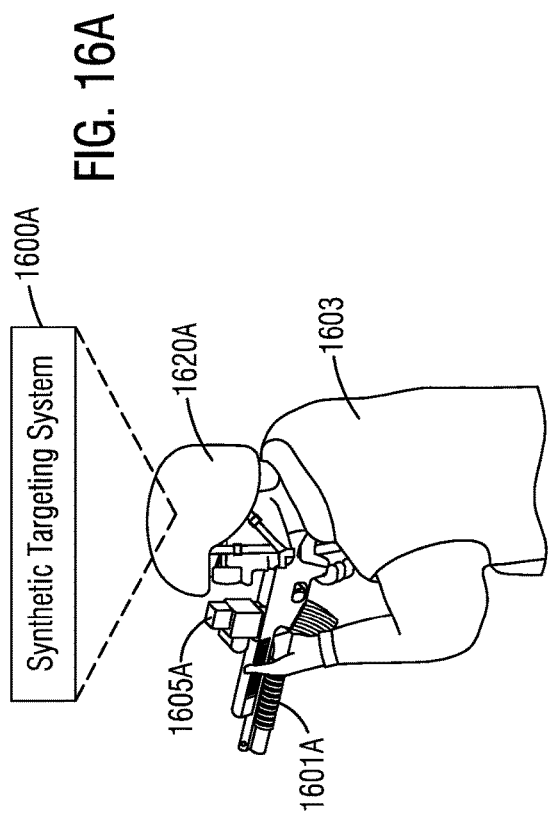
FIG. 16A illustrates an application for the synthetic targeting (ST) system to be used with a sight mounted on a weapon.

FIG. 16A illustrates an application of a synthetic targeting (ST) system 1600A being used by a user 1603 with the sight 1605A mounted to a weapon 1601A. The HMD apparatus 1620A is embedded in a helmet to attach the HMD apparatus 1620A to the head of the user. The ST system 1600A is configured for an environment where the device is a weapon 1601A. For example, the computer vision may include a database for comparing images of various weapons, land vehicles and uniforms. The database may include a database for comparing images associated with the terrain or environment. The database may include information related to landmarks, medical facilities, military installations, local police, etc.

Figure 16B:
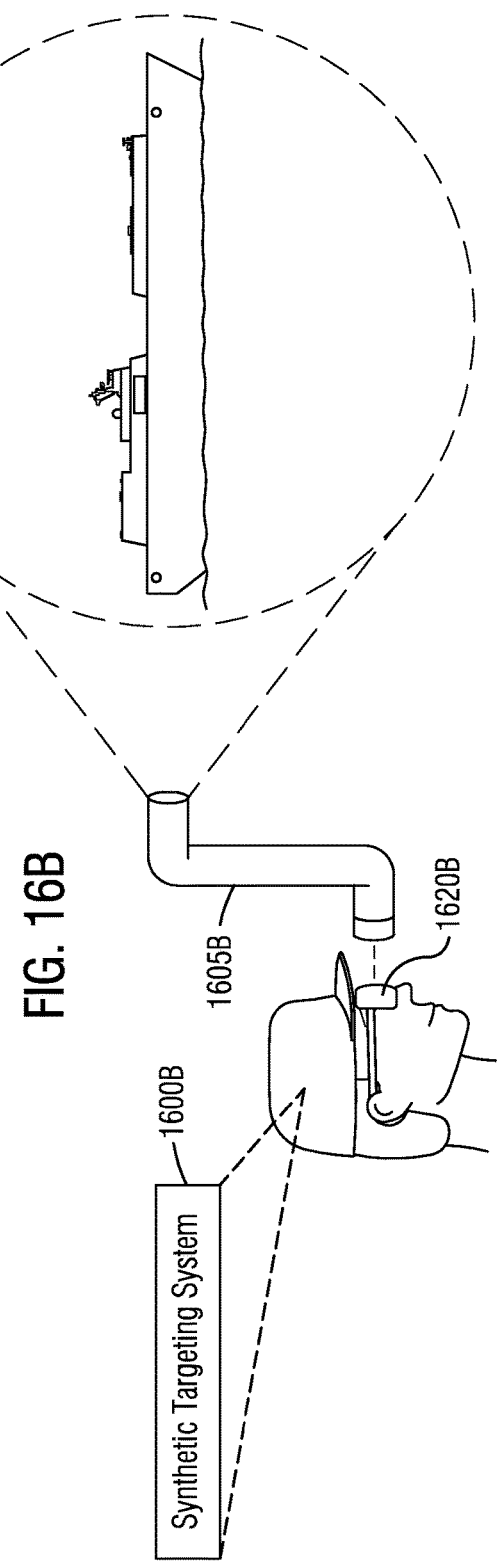
FIG. 16B illustrates an application for the synthetic targeting (ST) system to be used with a periscope type sight for an HMD synthetic targeting application.

FIG. 16B illustrates an application for the synthetic targeting (ST) system 1600B to be used with a periscope type sight 1605B for an HMD synthetic targeting application. The ST system 1600B is configured for an environment where the device is part of a periscope, sub-marine or marine applications. For example, the computer vision may include a database for comparing images of ships, boats, marine vessels and/or aircraft. The database may include a database for comparing images associated with sea animals. The database may include information related to shore line marks, islands, etc.

The HMD apparatus is worn by a user and operates in a similar manner as described in relation to FIGS. 3A and 3B and FIGS. 4A-4E. The periscope sight 1605B has a sight field of view (S-FOV) 1645 which displays the real-world view through the lens of the sight 1605B through the HMD lens. The AR information may be displayed or overlaid in the periscope imagery.

Figure 17:
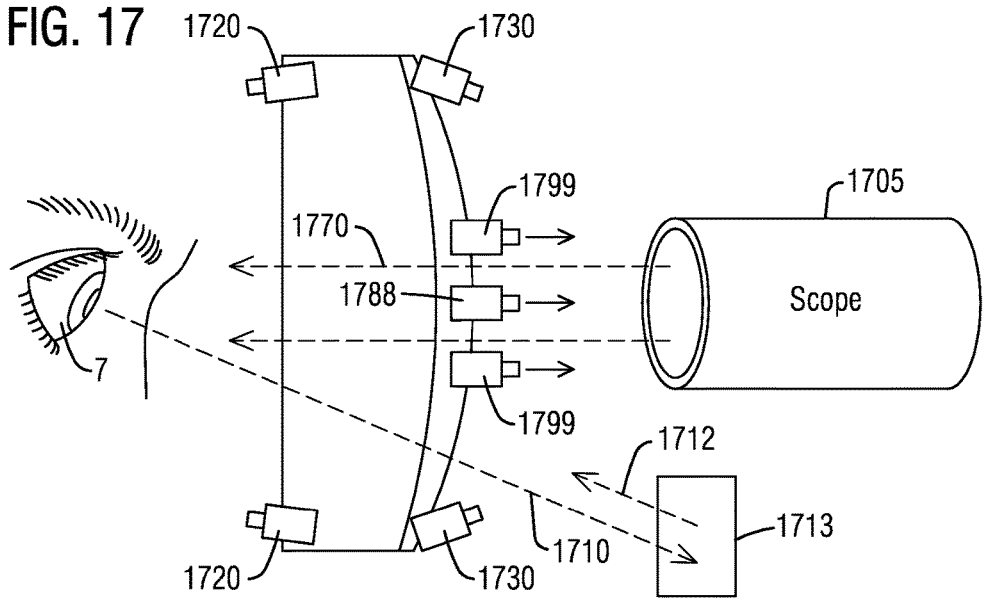
FIG. 17 illustrates an embodiment to detect objects in the sight field of view (S-FOV)

FIG. 17 illustrates an embodiment to detect objects in the sight field of view (S-FOV). The situational awareness creator (SAC) assembly 90 may include cameras 1788 and 1799 and a program code to perform the method steps of FIG. 18.

The light 1770 from the scope is collimated, that means that the light rays exit the scope in parallel, and hence are not visible by the forward-facing (scope-detection) sensors 1730, and the light has a direction towards the left of the page, and hence are not visible by the eye-tracking sensors 1720, since they are pointed toward the eye 7. To look down the barrel of the scope 1705, and see what the eye sees, at least one camera 1788 and 1799 may be mounted (fixed or removable) to the HMD surface, in front of the eye(s) 7. In some embodiments, the cameras 1788 and 1799 may be attached to the HMD apparatus in a manner which allows them to be rotated in and out of the line of sight to capture the real-world view of the sight.

The user may be constrained to always look through the scope 1705 through a certain aperture in the HMD apparatus, so that the mounted cameras 1788, 1799 may see what the user sees also. Camera 1788 is centered in front of the user's vision, when looking through the scope 1705, with eyes in the prescribed position for looking down the scope, and may thus interfere with the user's vision, although the camera would appear as a blurry spot in this proximity to the user's eyes. Alternatively, the cameras 1799 may be mounted outside the area of the user's pupils, thus allowing the user to see clearly down the scope.

To avoid having to have the user only look down the scope in one orientation, and allowing another view direction, such as in 1710, seeing the collimated light 1712 from the scope 1713, but outside the direction in which the scope cameras 1788, 1799 are viewing, it may be required to have an array of cameras across the front of the HMD apparatus pointing in different directions, parallel to the user's gaze as the eye rotates around its moving center. Thus, the cameras may be directed radially out from the center of the user's eye, and then the computer vision system (i.e., control system 117 coupled to the cameras) would choose the camera that matches with the location of the scope opening. The computer vision system may determine an object viewed in the sight field of view (S-FOV) and provide CGD relative to the object to the user. If a target is holding a particular weapon, the situational awareness (weapon type held by the target) captured by the cameras 1788 and 1799 may be determined and such information displayed to the user in the sight field of view (S-FOV).

The body or housing forming the scope 1705 is within the sensing area of the sensor's FOV in this figure, so the location and orientation of the at least one camera is known with respect to the HMD apparatus and HMD lens. The location of the HMD apparatus is known with respect to the real-world view. Hence, the scope's pointing direction and location can be determined with respect to the real-world view.

Figure 18:
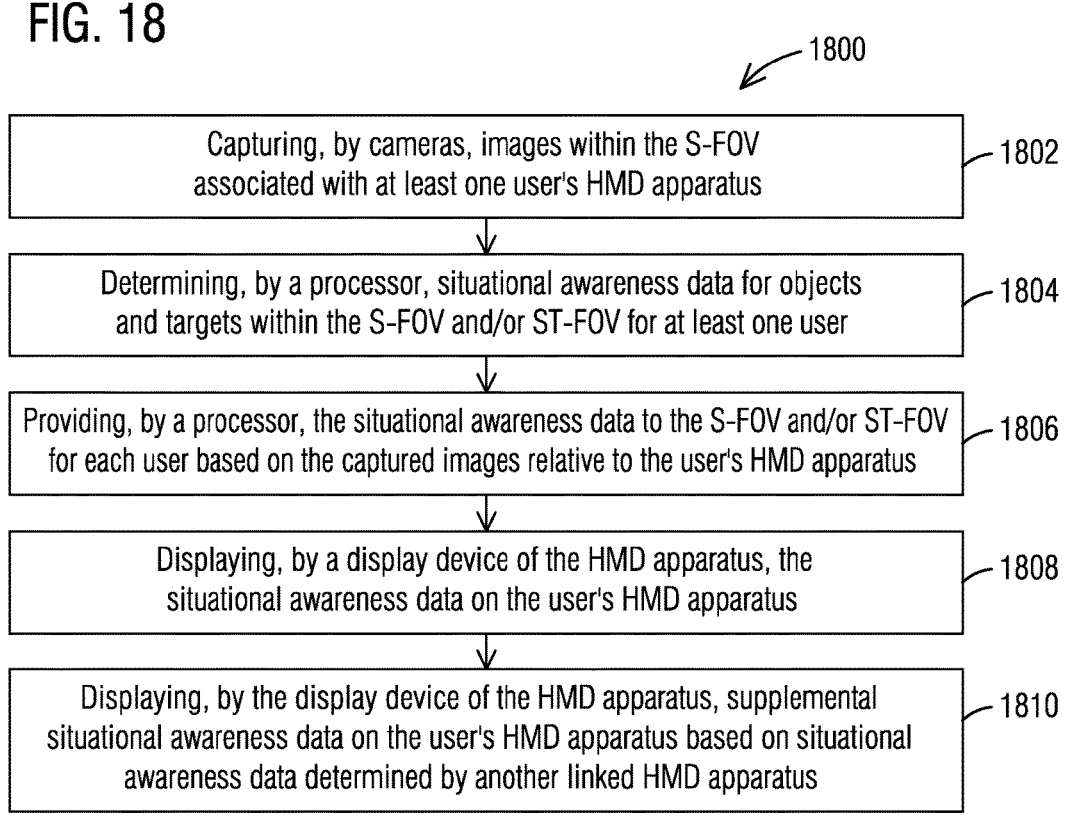
FIG. 18 illustrates a flowchart of a method for capturing situational awareness information and display in synthetic targeting environment.

FIG. 18 illustrates a flowchart of a method 1800 for capturing situational awareness information and display of same in synthetic targeting environment by the situational awareness creator (SAC) assembly 90 (FIG. 1 or FIG. 5A). The method 1800 may include, at block 1802, capturing, by cameras, images within the sight field of view (S-FOV) associated with at least one user's HMD apparatus. Each HMD apparatus captures images of their own sight field of view (S-FOV). However, the system 100 of the HMD apparatuses share information which is mapped and correlated to provide situational awareness information that may not be readily apparent to a respective one user relative to their sight field of view (S-FOV) or synthetic targeting field of view (ST-FOV). As referenced in FIG. 8B, the system 100 may highlight an area where an obscured target or foe may be located based on situational awareness information of others in the environment. In some embodiments, the EG-ROI frame may be used select a particular area in the sight field of view (S-FOV). Thus, the user may move their eye gaze direction to a particular area in the sight field of view (S-FOV) to move the EG-ROI frame to the object or area. The situational awareness creator (SAC) assembly 90 may then capture that portion of the sight field of view (S-FOV) for which to determine situational awareness information associated with the object or area being looked at by the user.

At block 1804, the method may include determining, by a processor, situational awareness information or data for objects and targets within the S-FOV and/or ST-FOV for at least one user. At block 1806, the method may include providing, by a processor, the situational awareness data or image to the S-FOV and/or ST-FOV for each user based on the captured images relative to the user's HMD apparatus.

At block 1808, the method may include displaying, by a display device of the HMD apparatus, the situational awareness data on the user's HMD apparatus. Each user's situational awareness data may be different based on their own location in the operational environment. In training scenario, each user may provide different situational awareness information to determine a user's response in a team or squad environment. The method of FIG. 18 may be performed with FIGS. 10A, 10B, 11, 12 and 13.

At block 1810, the method may include displaying, by the display device of the HMD apparatus, supplemental situational awareness data on the user's HMD apparatus based on situational awareness data determined by another linked HMD apparatus. By way of non-limiting example, supplemental situational awareness information may include determining a type of weapon based on direct sight of the weapon. User's that are out of sight of the weapon may receive information relative to the type of weapon and the proximity of such weapon as supplemental situational awareness. Situational awareness information is based on a user's location and orientation in the environment. Supplemental situational awareness information is based on externally collected situational awareness information.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that at the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A method comprising:
    capturing, by at least one sensor, an image of an optical sight of a device in range of a lens of a head mounted display (HMD) apparatus, the lens having an HMD field of view (H-FOV) of a real-world view and the optical sight having a sight lens with a sight field of view (S-FOV);
    matching, by a processor, optical sight image data representative of the captured image to stored optical sight model data of a plurality of stored optical sights to match a respective one stored optical sight to the in-range optical sight;
    determining, by the processor, an optical sight profile including a magnification factor of the S-FOV for the in-range optical sight, the optical sight profile associated with the matched respective one stored optical sight; and
    displaying, by a display device of the HMD apparatus for reflection from the lens of the HMD apparatus to an eye of the user, computer generated data (CGD) at a position in the H-FOV of the lens of the HMD apparatus relative to the S-FOV and at a magnification level according to the magnification factor of the S-FOV of the real-world view while looking through the sight lens of the in-range optical sight with the eye.

2. The method of claim 1, further comprising:
    capturing, by at least one eye tracking sensor mounted to the HMD apparatus, real-time eye tracking data associated with the eye used to look through the lens of the HMD apparatus and the sight lens of the in-range optical sight;
    determining, by the processor, an eye gaze direction of a user's eye based on the real-time eye tracking data; and
    determining an eye gaze region of interest (EG-ROI) frame for display in the S-FOV.

3. The method of claim 1, further comprising:
    determining, by the processor, the S-FOV relative to the H-FOV;
    determining, by the processor, a synthetic targeting field of view (ST-FOV) around the S-FOV;
    displaying, by the display device, a boundary indicative of the ST-FOV in the H-FOV;
    generating, by the processor, computer-generated data (CGD) for display in the ST-FOV; and
    displaying, by the display device, the CGD in the ST-FOV.

4. The method of claim 3, wherein the device is a weapon and further comprising:
    determining whether the HMD apparatus is in a training mode or a non-training mode;
    when in the training mode, displaying a training augmented reality (AR) image in one of the ST-FOV and the S-FOV; and
    tracking engagement of the user with the AR image using the weapon.

5. The method of claim 4, wherein when in the training mode, capturing behavioral responses relative to engagement of the AR image during use of the weapon; and recording the behavioral responses.

6. The method of claim 1, wherein the at least one sensor comprises a forward-facing sensor attached to the HMD apparatus, and further comprising:
    modeling, by the processor, the in-range optical sight, based on the optical sight image data wherein the determining of the optical sight profile includes determining a sight model and sight type, wherein the magnification factor being based on the sight type; and
    determining at least one of an optical sight location and optical sight orientation based on the modeling of the in-range optical sight.

7. The method of claim 6, further comprising:
    capturing at least one image of the S-FOV of the in-range optical sight, the at least one image of the S-FOV includes an image seen through the S-FOV;
    processing the image seen through the S-FOV to determine situational awareness information; and
    overlaying in the S-FOV the situational awareness information by displaying the situational awareness information on the lens of the HMD apparatus.

8. A tangible, non-transitory computer readable medium having stored thereon program code configured to, when executed by a processor, cause the processor to:
    receive, from at least one sensor, a captured optical sight image of an optical sight of a device in range of a lens of a head mounted display (HMD) apparatus, the lens having an HMD field of view (H-FOV) of a real-world view and the optical sight having a sight lens with a sight field of view (S-FOV);
    match optical sight image data representative of the captured optical sight image to stored optical sight model data of a plurality of stored optical sights to match a respective one stored optical sight to the in-range optical sight;
    determine a sight profile including a magnification factor of the S-FOV for the in-range optical sight, the sight profile associated with the matched respective one stored optical sight; and
    cause a display device of the HMD apparatus to display, for reflection from the lens of the HMD apparatus to an eye of the user, computer generated data (CGD) at a position in the H-FOV of the lens of the HMD apparatus relative to the S-FOV and at a magnification level according to the magnification factor of the S-FOV of the real-world view while looking through the sight lens of the in-range optical sight with the eye.

9. The computer readable medium of claim 8, wherein the program code is configured to, when executed by the processor, cause the processor to:
    receive, from at least one eye tracking sensor mounted to the HMD apparatus, real-time eye tracking data associated with the eye used to look through the lens of the HMD apparatus and the sight lens of the in-range optical sight;
    determine an eye gaze direction of a user's eye based on the real-time eye tracking data; and
    determine an eye gaze region of interest (EG-ROI) frame for display in the S-FOV.

10. The computer readable medium of claim 8, wherein the program code is configured to, when executed by the processor, cause the processor to:
- determine the S-FOV relative to the H-FOV;
- determine a synthetic targeting field of view (ST-FOV) around the S-FOV;
- cause the display device to display a boundary indicative of the ST-FOV in the H-FOV;
- generate computer-generated data (CGD) for display in the ST-FOV; and
- cause the display device to display the CGD in the ST-FOV.

11. The computer readable medium of claim 10, wherein the device is a weapon and wherein the program code is configured to, when executed by the processor, cause the processor to:
- determine whether the HMD apparatus is in a training mode or a non-training mode;
- when in the training mode, cause the display device to display a training augmented reality (AR) image in one of the ST-FOV and the S-FOV; and
- track engagement of the user with the AR image using the weapon.

12. The computer readable medium of claim 11, wherein the program code is configured to, when executed by the processor, cause the processor to:
- when in the training mode, determine behavioral responses relative to engagement of the AR image during use of the weapon; and record the behavioral responses.

13. The computer readable medium of claim 8, wherein the program code is configured to, when executed by the processor, cause the processor to:
- process the received captured optical sight image of the in-range optical sight wherein the at least one sensor comprises a forward-facing sensor attached to the HMD apparatus;
- model the in-range optical sight, based on the processed image to create the optical sight model data wherein the optical sight profile further includes a sight model and sight type, wherein the magnification factor being based on the sight type; and
- determine at least one of a sight location and sight orientation based on the created optical sight model.

14. The computer readable medium of claim 13, wherein the program code is configured to, when executed by the processor, cause the processor to:
- receive at least one captured image of the S-FOV of the in-range optical sight, the at least one captured image of the S-FOV includes an image seen through the S-FOV;
- process the captured image seen through the S-FOV to determine situational awareness information; and
- cause the display device to overlay in the S-FOV of the situational awareness information on the lens of the HMD apparatus.

15. A system comprising:
- a head mounted display (HMD) apparatus having HMD lenses and at least one display device;
- eye-tracking sensors to track eye movements coupled to the HMD apparatus;
- forward-facing sensors coupled to the HMD apparatus configured to capture an optical sight image of an optical sight of a device in range of a respective one HMD lens of the HMD lenses, the respective one HMD lens having an HMD field of view (H-FOV) of a real-world view and the optical sight having a sight lens with a sight field of view (S-FOV); and
- a processor coupled to the HMD apparatus, the processor configured to:
  - match optical sight image data representative of the captured optical sight image to stored optical sight model data of a plurality of stored optical sights to match a respective one stored optical sight to the in-range optical sight;
  - determine a sight profile including a magnification factor of a sight field of view (S-FOV) for the in-range optical sight associated with the matched respective one stored optical sight; and
  - cause a respective one display device associated with the respective one lens to display, for reflection from the respective one HMD lens of the HMD apparatus to an eye of the user, computer generated data (CGD) at a position in the H-FOV of the respective one HMD lens relative to the S-FOV and a magnification level according to the magnification factor of the S-FOV of the real-world view while looking through the sight lens of the in-range optical sight with the eye.

16. The system of claim 15, wherein the processor is further configured to:
- receive, from at least one eye tracking sensor mounted to the HMD apparatus, real-time eye tracking data associated with the eye used to look through the respective one HMD lens and the sight lens of the in-range optical sight;
- determine an eye gaze direction of a user's eye based on the real-time eye tracking data; and
- determine an eye gaze region of interest (EG-ROI) frame for display in the S-FOV.

17. The system of claim 15, wherein the processor is further configured to:
- determine the S-FOV relative to the H-FOV;
- determine a synthetic targeting field of view (ST-FOV) around the S-FOV;
- cause the display device to display a boundary indicative of the ST-FOV in the H-FOV;
- generate computer-generated data (CGD) for display in the ST-FOV; and
- cause the display device to display the CGD in the ST-FOV.

18. The system of claim 17, wherein the processor is further configured to:
- determine whether the HMD apparatus is in a training mode or a non-training mode;
- when in the training mode, cause the display device to display a training augmented reality (AR) image in one of the ST-FOV and the S-FOV; and
- track engagement of the user with the AR image using the weapon.

19. The system of claim 18, wherein the processor is further configured to:
- when in the training mode, determine behavioral responses relative to engagement of the AR image during use of the weapon; and
- record the behavioral responses.

20. The system of claim 15, wherein the processor is further configured to:
- model the in-range optical sight, based on the captured optical sight image to create the optical sight model data wherein the optical sight profile further includes a sight model and sight type wherein the magnification factor is based on the sight type.

* * * * *

UNITED STATES PATENT AND TRADEMARK OFFICE
CERTIFICATE OF CORRECTION

PATENT NO.        : 10,510,137 B1
APPLICATION NO.   : 15/848620
DATED             : December 17, 2019
INVENTOR(S)       : Joshua D. Kitain et al.

It is certified that error appears in the above-identified patent and that said Letters Patent is hereby corrected as shown below:

In the Claims

Column 34, Claim 7, Line 23, delete "at least one".

Signed and Sealed this
Twenty-fifth Day of February, 2020

Andrei Iancu
*Director of the United States Patent and Trademark Office*